United States Patent
Kawasaki et al.

(10) Patent No.: US 11,758,607 B2
(45) Date of Patent: Sep. 12, 2023

(54) USER EQUIPMENT, CONTROL APPARATUS, AND COMMUNICATION CONTROL METHOD

(71) Applicant: SHARP KABUSHIKI KAISHA, Sakai (JP)

(72) Inventors: Yudai Kawasaki, Sakai (JP); Masafumi Aramoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 433 days.

(21) Appl. No.: 17/267,428

(22) PCT Filed: Jul. 25, 2019

(86) PCT No.: PCT/JP2019/029320
§ 371 (c)(1),
(2) Date: Feb. 9, 2021

(87) PCT Pub. No.: WO2020/031735
PCT Pub. Date: Feb. 13, 2020

(65) Prior Publication Data
US 2021/0329725 A1    Oct. 21, 2021

(30) Foreign Application Priority Data
Aug. 10, 2018   (JP) ................. 2018-151352

(51) Int. Cl.
*H04W 76/22* (2018.01)
*H04W 76/11* (2018.01)
*H04W 76/32* (2018.01)
*H04W 84/12* (2009.01)

(52) U.S. Cl.
CPC ............ *H04W 76/22* (2018.02); *H04W 76/11* (2018.02); *H04W 76/32* (2018.02); *H04W 84/12* (2013.01)

(58) Field of Classification Search
CPC ......... H04L 12/28; H04L 12/50; H04W 77/26
USPC ........................ 370/329, 401, 403
See application file for complete search history.

(56) References Cited

U.S. PATENT DOCUMENTS 11,627,635 B2 *  4/2023  Abraham ............... H04W 76/27
370/328
2015/0163745 A1   6/2015  Kim et al.

OTHER PUBLICATIONS

"3rd Generation Partnership Project; Technical Specification Group Services and System Aspects; System Architecture for the 5G System; Stage 2(Release 15)", 3GPP TS 23.501 V15.2.0 (Jun. 2018).

(Continued)

*Primary Examiner* — Dang T Ton
(74) *Attorney, Agent, or Firm* — ScienBiziP, P.C.

(57) ABSTRACT

Provided is, in 5GS, a communication unit for implementing a Vertical LAN. Provided are, in 5GS, a unit for registration of a UE, a session establishment procedure, and generation of a 5GLAN group for implementing the Vertical LAN and a 5GLAN service, a unit for starting communication using the Vertical LAN and the 5GLAN service, and the communication unit. In addition, provided are a unit for modifying a configuration of the UE registered with a network, a unit for managing an established session, a unit for deleting the 5GLAN group, a unit for deleting the UE from the 5GLAN group, and a unit for stopping communication using the Vertical LAN and the 5GLAN service.

4 Claims, 10 Drawing Sheets

(56) References Cited

OTHER PUBLICATIONS

"3rd Generation Partnership Project; Technical Specification Group Services and System Aspects; Procedures for the 5G System; Stage 2 (Release 15)", 3GPP TS 23.502 V15.2.0 (Jun. 2018).

"3rd Generation Partnership Project; Technical Specification Group Services and System Aspects; Study on 5GS Enhanced support of Vertical and LAN Services; (Release 16)", 3GPP TR 23.734 V0.1.0 (Jul. 2018).

"3rd Generation Partnership Project; Technical Specification Group Core Network and Terminals; 5G System—Phase 1; CT WG1 Aspects(Release 15)", 3GPP TR 24.890 V15.1.0 (Mar. 2018).

"3rd Generation Partnership Project; Technical Specification Group Services and System Aspects; Feasibility Study on LAN Support in 5G (Release 16)", 3GPP TR 22.821 V16.1.0 (Jun. 2018).

\* cited by examiner

USER EQUIPMENT, CONTROL APPARATUS, AND COMMUNICATION CONTROL METHOD

TECHNICAL FIELD

The present disclosure relates to a user equipment, a control apparatus, and a communication control method. This application claims priority based on JP 2018-151352 filed on Aug. 10, 2018, the contents of which are incorporated herein by reference.

BACKGROUND ART

In 3rd Generation Partnership Project (3GPP), system architecture of the 5G System (5GS), which is a mobile communication system of the next generation, specifically the fifth generation (5G), has been started to be studied, and support of new procedures and new functions has been discussed (see NPL 1, NPL 2, and NPL 3).

For example, required conditions include optimization and diversification of a communication procedure for supporting a continual mobile communication service according to various services, optimization of the system architecture in accordance with the optimization and diversification of the communication procedure, and the like.

CITATION LIST

Non Patent Literature

NPL 1: 3GPP TS 23.501 v15.2.0 (2018-06); Technical Specification Group Services and System Aspects; System Architecture for the 5G System; Stage 2 (Release 15)
NPL 2: 3GPP TS 23.502 v15.2.0 (2018-06); Technical Specification Group Services and System Aspects; Procedures for the 5G System; Stage 2 (Release 15)
NPL 3: 3GPP TR 23.734 V0.1.0 (2018-07); Technical Specification Group Services and System Aspects; Study on 5GS Enhanced support of Vertical and LAN Services; (Release 16)

SUMMARY OF INVENTION

Technical Problem

For the 5G System (5GS), in order to provide various services, a 5G Core Network (5GCN), which is a new core network, has been studied. In addition, for 5GS, a Vertical LAN has been studied as a new function. For the Vertical LAN, a 5GLAN service for implementing Local Area Network (LAN) connection in the 5GS has been studied. Note that, in the following, the expression "to implement the 5GLAN service" may mean "to implement the Vertical LAN". In a similar manner, the expression "for the sake of the Vertical LAN" may mean "for the sake of the 5GLAN service".

Specifically, for the Vertical LAN, a scheme in which two or more UEs belong to a group (for example, a 5GLAN group) for performing private communication has been studied. Here, the private communication may be 5GLAN communication. In addition, a case that the UEs perform transmission and/or reception of data by using private communication may mean that the UEs perform transmission and/or reception of data between the UEs without using the Internet and a service network such as a DN. Note that the private communication is not limited to this, and means transmission and/or reception of data between the UEs belonging to a specific group in the 5GS.

As described above, a scheme in which two or more UEs belonging to the same group perform transmission and/or reception of data by using private communication in the communication system using the Vertical LAN has been studied. However, a specific means or method for implementing the Vertical LAN has not yet been made clear.

One aspect of the present invention is made in the light of the circumstances as described above, and has an object to provide a method for implementing a function for a Vertical LAN in a 5GS.

Solution to Problem

A user equipment according to one embodiment of the present invention includes: a controller configured to establish a Protocol Data Unit (PDU) session associated with a 5G Local Area Data Network (5G LAN) group ID in a PDU session establishment procedure; and a transmission and/or reception unit configured to receive a PDU session release command message including information A from a control apparatus in a PDU session release procedure. The information A is information indicating a cause for release of the PDU session. The controller releases the PDU session, based on completion of the PDU session release procedure. In a case that the information A is information indicating that a 5G LAN group identified with the 5G LAN group ID is deleted, the controller deletes the 5G LAN group ID. In a case that the information A is information indicating that the user equipment has been removed from the 5G LAN group, the controller maintains the 5G LAN group ID.

A control apparatus according to one embodiment of the present invention includes: a controller configured to establish a Protocol Data Unit (PDU) session associated with a 5G Local Area Data Network (5G LAN) group ID in a PDU session establishment procedure; and a transmission and/or reception unit configured to transmit a PDU session release command message including information A to a user equipment in a PDU session release procedure. The information A is information indicating a cause for release of the PDU session. In a case that a 5G LAN group identified with the 5G LAN group ID is deleted, the transmission and/or reception unit configures information indicating that the 5G LAN group has been deleted for the information A. In a case that the control apparatus is removed from the 5G LAN group, the transmission and/or reception unit configures information indicating that the control apparatus has been removed from the 5G LAN group for the information A.

A communication control method for a user equipment according to one embodiment of the present invention includes the steps of establishing a Protocol Data Unit (PDU) session associated with a 5G Local Area Data Network (5G LAN) group ID in a PDU session establishment procedure; and receiving a PDU session release command message including information A from a control apparatus in a PDU session release procedure. The information A is information indicating a cause for release of the PDU session. The user equipment releases the PDU session, based on completion of the PDU session release procedure. In a case that the information A is information indicating that a 5G LAN group identified with the 5G LAN group ID is deleted, the user equipment deletes the 5G LAN group ID. In a case that the information A is information indicating that the user equipment has been removed from the 5G LAN group, the user equipment maintains the 5G LAN group ID.

A communication control method for a control apparatus according to one embodiment of the present invention includes the steps of: establishing a Protocol Data Unit (PDU) session associated with a 5G Local Area Data Network (5G LAN) group ID in a PDU session establishment procedure; and transmitting a PDU session release command message including information A to a user equipment in a PDU session release procedure. The information A is information indicating a cause for release of the PDU session. In a case that a 5G LAN group identified with the 5G LAN group ID is deleted, the control apparatus configures information indicating that the 5G LAN group has been deleted for the information A. In a case that the control apparatus is removed from the 5G LAN group, the control apparatus configures information indicating that the control apparatus has been removed from the 5G LAN group for the information A.

Advantageous Effects of Invention

According to one aspect of the present invention, in 5GS, a Vertical LAN can be implemented, and registration of a UE, establishment of a session, management of the session, and modification/update of a configuration of the UE for implementing the Vertical LAN can be performed.

DESCRIPTION OF EMBODIMENTS

With reference to the drawings, the best mode for carrying out the present invention will be described.

1. Overview of System

Figure 1:
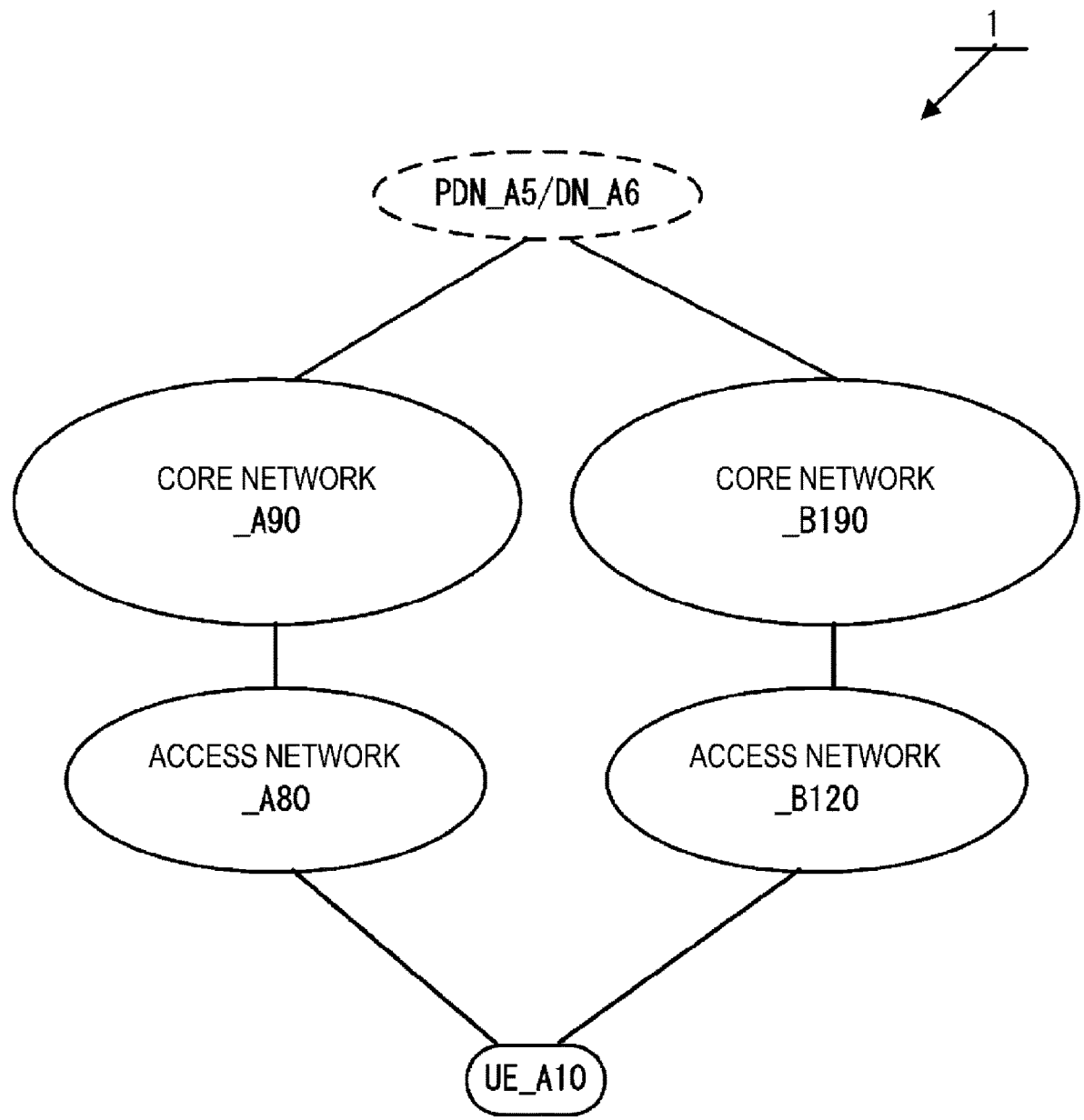
FIG. 1 is a diagram illustrating an outline of a mobile communication system (EPS/5GS).
Figure 2:
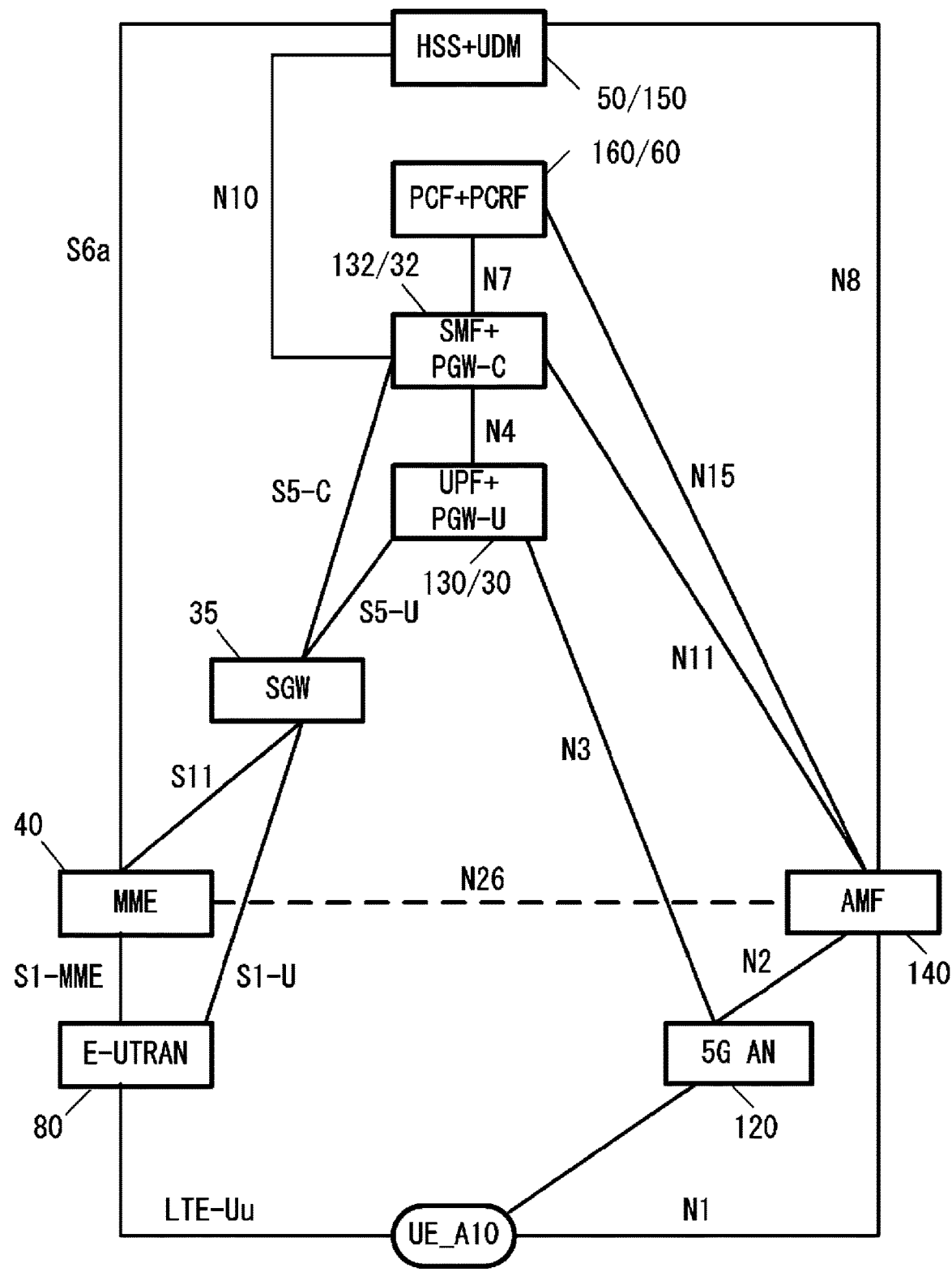
FIG. 2 is a diagram illustrating a detailed configuration of the mobile communication system (EPS/5GS).

First, FIG. 1 is a diagram for describing an outline of a mobile communication system 1 used in each embodiment, and FIG. 2 is a diagram for describing a detailed configuration of the mobile communication system 1.

FIG. 1 illustrates a configuration that the mobile communication system 1 includes a UE_A 10, an access network_A 80, a core network_A 90, a Packet Data Network (PDN)_A 5, an access network_B 120, a core network_B 190, and a Data Network (DN)_A 6.

In the following, regarding these apparatuses and functions, symbols may be omitted in description, such as a UE_A, an access network_A, a core network_A, a PDN_A, an access network_B, a core network_B, and a DN_A. In addition, the UE_A 10 may be referred to as a UE, the access network_A 80 and/or the access network_B 120 may be referred to as an access network, the core network_A 90 and/or the core network_B 190 may be referred to as a core network, the PDN_A 5 may be referred to as a PDN, and the DN_A 6 may be referred to as a DN.

FIG. 2 illustrates apparatuses and functions such as a UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, and a UDM 150, and interfaces for connecting these apparatuses and functions to each other.

In the following, regarding these apparatuses and functions, symbols may be omitted in description, such as a UE_A, an E-UTRAN, an MME, an SGW, a PGW-U, a PGW-C, a PCRF, an HSS, a 5G AN, an AMF, a UPF, an SMF, a PCF, and a UDM. In addition, the UE_A 10 may be referred to as a UE.

Note that an Evolved Packet System (EPS) being a 4G system includes the access network_A and the core network_A, but may further include the UE and/or the PDN. A 5G System (5GS) being a 5G system includes the UE, the access network_B, and the core network_B, but may further include the DN.

The UE is an apparatus that can connect to a network service via 3GPP access (also referred to as a 3GPP access network or a 3GPP AN) and/or non-3GPP access (also referred to as a non-3GPP access network or a non-3GPP AN). The UE may be a terminal apparatus that can perform radio communication such as a mobile phone and a smartphone and may be a terminal apparatus that can connect to EPS and 5GS as well. The UE may include a Universal Integrated Circuit Card (UICC) and an Embedded UICC (eUICC). Note that the UE may be referred to as a user equipment, or may be referred to as a terminal apparatus.

The access network_A corresponds to an Evolved Universal Terrestrial Radio Access Network (E-UTRAN) and/or a wireless LAN access network. In the E-UTRAN, one or more evolved Node Bs (eNBs) 45 are deployed. Note that, in the following, regarding the eNB 45, a symbol may be omitted in description, such as an eNB. In a case that there are multiple eNBs, each eNB is connected to each other via an X2 interface, for example. In the wireless LAN access network, one or more access points are deployed.

The access network_B corresponds to a 5G access network (5G AN). The 5G AN includes an NG Radio Access Network (NG-RAN) and/or a non-3GPP access network. In the NG-RAN, one or more NR Node Bs (gNBs) 122 are deployed. Note that, in the following, regarding the gNB122, a symbol may be omitted in description such as an eNB. The gNB is a node that provides a New Radio (NR) user plane and a control plane for the UE, and is a node that connects an NG interface (including an N2 interface or an N3 interface) to a 5GCN. Specifically, the gNB is a base station apparatus that is newly designed for the 5GS, and has a function different from that of the base station apparatus (eNB) that is used in EPS being the 4G system. In a case that there are multiple gNBs, each gNB is connected to each other via an Xn interface, for example.

In the following, the E-UTRAN and the NG-RAN may be referred to as 3GPP access. The wireless LAN access network and the non-3GPP AN may be referred to as non-3GPP access. The nodes deployed in the access network_B may also be collectively referred to as an NG-RAN node.

In the following, the access network_A, and/or the access network_B, and/or the apparatus included in the access network_A, and/or the apparatus included in the access network_B may be referred to as an access network or an access network apparatus.

The core network_A corresponds to Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

The core network_B corresponds to a 5G Core Network (5GCN). In the 5GCN, for example, an Access and Mobility Management Function (AMF), a User Plane Function (UPF), a Session Management Function (SMF), a Policy Control Function (PCF), a Unified Data Management (UDM), and the like are deployed. Here, the 5GCN may be referred to as 5GC.

In the following, the core network_A, and/or the core network_B, the apparatus included in the core network_A, and/or the apparatus included in the core network_B may be referred to as a core network or a core network apparatus.

The core network (the core network_A and/or the core network_B) may be an IP mobile communication network that is operated by a Mobile Network Operator (MNO) in which the access network (the access network_A and/or the access network_B) and the PDN and/or the DN are connected, may be a core network for a mobile network operator that manages and operates the mobile communication system 1, or may be a core network for a virtual mobile network operator and a virtual mobile communication service provider such as a Mobile Virtual Network Operator (MVNO) and a Mobile Virtual Network Enabler (MVNE).

FIG. 1 illustrates a case that the PDN and the DN are the same, but the PDN and the DN may be different from each other. The PDN may be a Data Network (DN) that provides a communication service for the UE. Note that the DN may be configured as a packet data service network, or may be configured for each service. In addition, the PDN may include a connected communication terminal. Thus, connecting to the PDN may be equivalent to connecting to a communication terminal and a server apparatus deployed in the PDN. In addition, transmitting and/or receiving user data with the PDN may be equivalent to transmitting and/or receiving user data to and/or from a communication terminal and a server apparatus deployed in the PDN. Note that the PDN may be referred to as a DN, or the DN may be referred to as a PDN.

In the following, at least a part of the access network_A, the core network_A, the PDN, the access network_B, the core network_B, and the DN, and/or one or more apparatuses included in these may be referred to as a network or a network apparatus. In other words, a case that the network and/or the network apparatus transmits and/or receives a message and/or performs a procedure means that at least a part of the access network_A, the core network_A, the PDN, the access network_B, the core network_B, and the DN, and/or the one or more apparatuses included in these transmit and/or receive the message and/or perform the procedure.

The UE can connect to the access network. The UE can connect to the core network via the access network. In addition, the UE can connect to the PDN or the DN via the access network and the core network. Specifically, the UE can transmit and/or receive (communicate) user data to and/or from the PDN or the DN. In a case that the user data is transmitted and/or received, non-IP communication may be used as well as Internet Protocol (IP) communication.

Here, the IP communication refers to data communication using the IP, and transmission and/or reception of data is performed using IP packets. Each of the IP packet includes an IP header and a payload section. In the payload section, data transmitted and/or received by the apparatus and the function included in EPS and the apparatus and the function included in 5GS may be included. The non-IP communication refers to data communication not using the IP, and transmission and/or reception of data is performed using a format different from the structure of the IP packets. For example, the non-IP communication may be data communication implemented through transmission and/or reception of application data not given the IP header, or user data that is given another header such as a MAC header and an Ethernet (trade name) frame header and that is transmitted and/or received by the UE may be transmitted and/or received.

Figure 10:
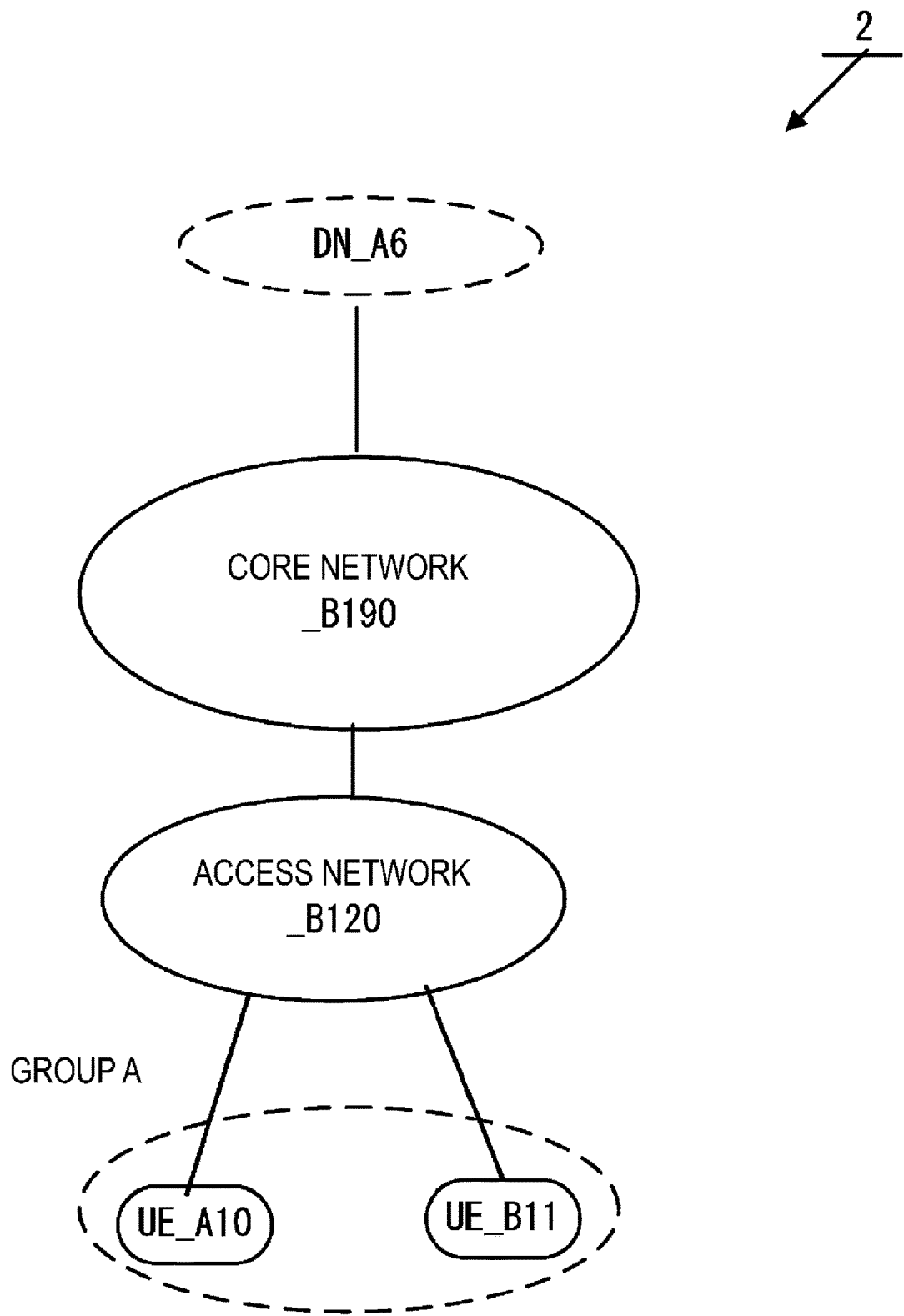
FIG. 10 is a diagram illustrating an outline of a Vertical LAN.

In addition, with reference to FIG. 10, a mobile communication system using a 5GLAN service implemented according to the present embodiment will be described. FIG. 10 illustrates that a mobile communication system 2 using the 5GLAN service includes a UE_A 10, a UE_B 11, an access network_B 120, a core network_B 190, and a Data Network (DN)_A 6. Note that the mobile communication system 2 using the 5GLAN service may be an example of the mobile communication system 1.

In the following, regarding these apparatuses and functions, symbols may be omitted in description, such as a UE_A, a UE_B, an access network_B, a core network_B, and a DN_A. In addition, the UE_A 10 and/or the UE_B 11 may be referred to as a UE or each UE, the access network_B 120 may be referred to as an access network, the core network_B 190 may be referred to as a core network, and the DN_A 6 may be referred to as a DN.

In FIG. 10, the UE_A and the UE_B establish a PDU session for implementing a Vertical LAN. Note that the PDU session for implementing the Vertical LAN may be a PDU session for the 5GLAN. In addition, the UE_A and the UE_B belong to a group A for performing private communication. Here, the group A may be one of one or multiple 5GLAN groups being groups for the 5GLAN supported by the network and/or the UE. The UE_A and the UE_B may additionally belong to a group other than the group A, or may belong to only the group A. In a case that each UE simultaneously belongs to multiple groups, the PDU session may be established for each group. Regarding members belonging to the group A, the UE and/or each apparatus in the core network may initiate an addition or deletion procedure at any timing. The group A may be identified with a group ID or other information.

The UE_A and the UE_B may establish the PDU sessions via the same gNB, or may be in a state in which the PDU sessions are established via different gNBs. In addition, the UE_A and the UE_B may establish the PDU sessions via the same UPF, or the PDU sessions may be established via different UPFs.

In addition, the UE_A and the UE_B may be registered with and managed by an apparatus in the same core network, or may be registered with or managed by apparatuses in different core networks. Specifically, the UE_A and the UE_B may be registered with the same AMF, or may be registered with different AMFs. In addition, regarding the UE_A and the UE_B, the sessions may be managed by the same SMF, or the sessions may be managed by different SMFs. The UE_A and the UE_B is registered in another apparatus in a core network and management of the sessions may be performed by the apparatus.

In a case that the UE_A and the UE_B establish the PDU session via the same UPF, the UE_A and the UE_B may perform private communication via the UPF without using the DN. In addition, in a case that the UE_A and the UE_B establish the PDU session via different UPFs, private communication may be performed by using an interface between the UPFs.

In a case that the UE_A and the UE_B are registered with the same AMF, the AMF may perform management of the UEs belonging to the group A. Regardless of a case that the UE_A and the UE_B are registered with different AMFs or a case that the UE_A and the UE_B are registered with the same AMF, an apparatus in the core network other than the AMF may perform management of the UEs belonging to the group A.

In addition, the UE_A and the UE_B may perform transmission and/or reception of data by using the non-IP communication. For example, in a case that the UE_A and the UE_B implement the Vertical LAN by using the non-IP communication, the UE_A and the UE_B may perform transmission and/or reception of data using Ethernet (trade name) by using the UPF as a HUB or a default router. Note that the UPF having a function as the HUB or the default router may be a special UPF, and the UE_A and the UE_B may establish the PDU session with the UPF having the special function being used as a gateway.

In addition, the UE_A and/or the UE_B may have the function of the HUB and the default router. In this case, the UE_A and/or the UE_B may be registered with the network as the default router in the group by transmitting capability information indicating that the UE_A and/or the UE_B has the function of the HUB and the default router being included in a Registration request message and then receiving information indicating that the request has been accepted with a Registration accept message and/or capability information of the network.

2. Configuration of Each Apparatus

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware that is configured on general-purpose hardware, or may be configured as software. At least a part (including the entirety) of the functions of each apparatus may be configured as the physical hardware, the logical hardware, or the software.

Note that each storage unit (a storage unit_A 340, a storage unit_A 440, a storage unit_B 540, a storage unit_A 640, and a storage unit_B 740) in each apparatus and function to be described below includes, for example, a semiconductor memory, a Solid State Drive (SSD), a Hard Disk Drive (HDD), or the like. Each storage unit can store various pieces of information transmitted and/or received to and/or from the apparatus and the function (for example, the UE, and/or the access network apparatus, and/or the core network apparatus, and/or the PDN, and/or the DN) other than its own apparatus and function, as well as information that is originally configured at the time of shipping. Each storage unit can store identification information, control information, flags, parameters, and the like that are included in a control message transmitted and/or received in various communication procedures to be described later. Each storage unit may store these pieces of information for each UE. In a case that interworking between 5GS and EPS is performed, each storage unit can store control messages and user data transmitted and/or received to and/or from the apparatus and the function included in 5GS and/or EPS. In this case, each storage unit can store what is transmitted and/or received without using an N26 interface as well as what is transmitted and/or via an N26 interface.

2.1. Apparatus Configuration of UE

Figure 3:
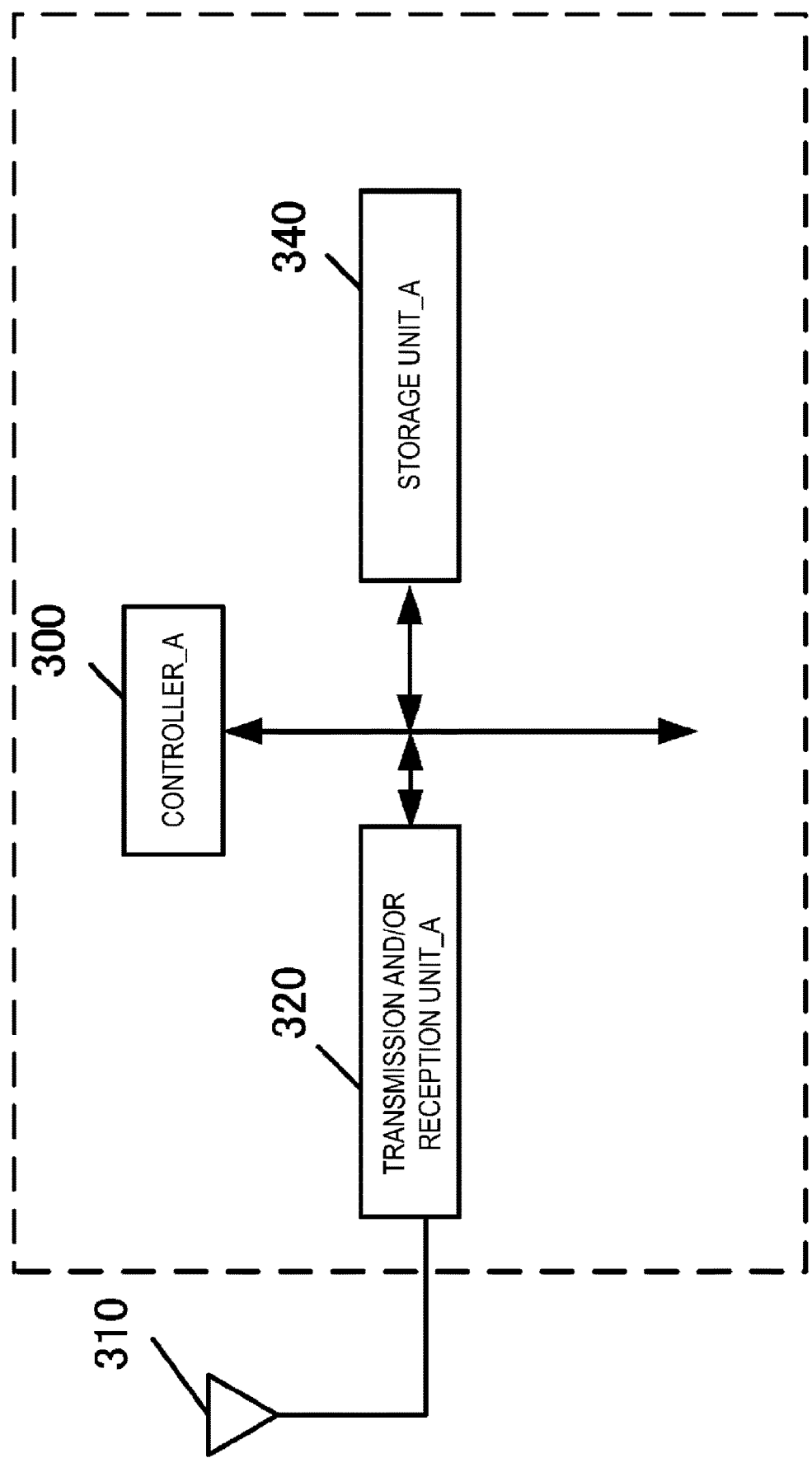
FIG. 3 is a diagram illustrating an apparatus configuration of a UE.

First, an apparatus configuration example of the User Equipment (UE) will be described with reference to FIG. 3. The UE includes a controller_A 300, an antenna 310, a transmission and/or reception unit_A 320, and a storage unit_A 340. The controller_A 300, the transmission and/or reception unit_A 320, and the storage unit_A 340 are connected via a bus. The transmission and/or reception unit_A 320 is connected to the antenna 310.

The controller_A 300 is a functional unit that controls operations and functions of the entire UE. The controller_A 300 implements various types of processing in the UE by reading and performing various programs stored in the storage unit_A 340 as necessary.

The transmission and/or reception unit_A 320 is a functional unit for performing radio communication with the base station apparatus (the eNB or the gNB) in the access network via the antenna. Specifically, the UE can transmit and/or receive the user data and/or the control information to and/or from the access network apparatus, and/or the core network apparatus, and/or the PDN, and/or the DN by using the transmission and/or reception unit_A 320.

To give detailed description with reference to FIG. 2, the UE can communicate with the base station apparatus (eNB) in the E-UTRAN via the LTE-Uu interface by using the transmission and/or reception unit_A 320. The UE can communicate with the base station apparatus (gNB) in the 5G AN by using the transmission and/or reception unit_A 320. The UE can perform transmission and/or reception of a Non-Access-Stratum (NAS) message to and/or from the AMF via an N1 interface by using the transmission and/or reception unit_A 320. Note that the N1 interface is a logical interface, and thus in actuality, the communication between the UE and the AMF is performed via the 5G AN.

The storage unit_A 340 is a functional unit for storing programs, user data, control information, and the like that are necessary for each operation of the UE.

2.2. Apparatus Configuration of gNB

Figure 4:
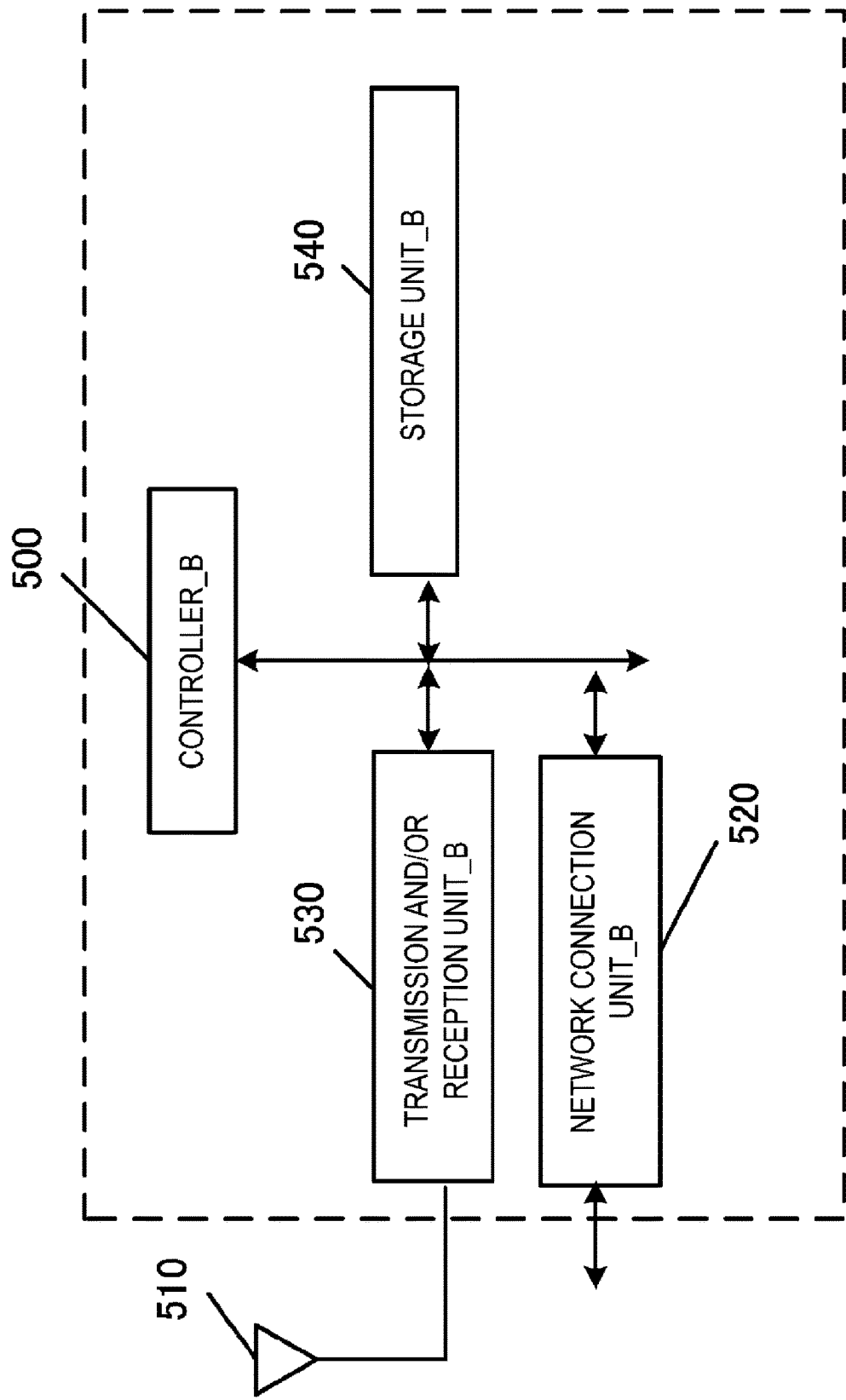
FIG. 4 is a diagram illustrating a configuration of an access network apparatus (gNB) in 5GS.

Next, an apparatus configuration example of the gNB will be described with reference to FIG. 4. The gNB includes a controller_B 500, an antenna 510, a network connection unit B 520, a transmission and/or reception unit_B 530, and a storage unit_B 540. The controller_B 500, the network connection unit_B 520, the transmission and/or reception unit_B 530, and the storage unit_B 540 are connected via a bus. The transmission and/or reception unit_B 530 is connected to the antenna 510.

The controller_B 500 is a functional unit that controls operations and functions of the entire gNB. The controller_B 500 implements various types of processing in the gNB by reading and performing various programs stored in the storage unit_B 540 as necessary.

The network connection unit_B 520 is a functional unit for the gNB to communicate with the AMF and/or the UPF. Specifically, the gNB can transmit and/or receive the user data and/or the control information to and/or from the AMF and/or the UPF by using the network connection unit_B 520.

The transmission and/or reception unit_B 530 is a functional unit for performing radio communication with the UE via the antenna 510. Specifically, the gNB can transmit and/or receive the user data and/or the control information to and/or from the UE by using the transmission and/or reception unit_B 530.

To give detailed description with reference to FIG. 2, the gNB in the 5G AN can communicate with the AMF via the N2 interface and can communicate with the UPF via the N3 interface by using the network connection unit_B 520. The gNB can communicate with the UE by using the transmission and/or reception unit_B 530.

The storage unit_B 540 is a functional unit for storing programs, user data, control information, and the like that are necessary for each operation of the gNB.

2.3. Apparatus Configuration of AMF

Figure 5:
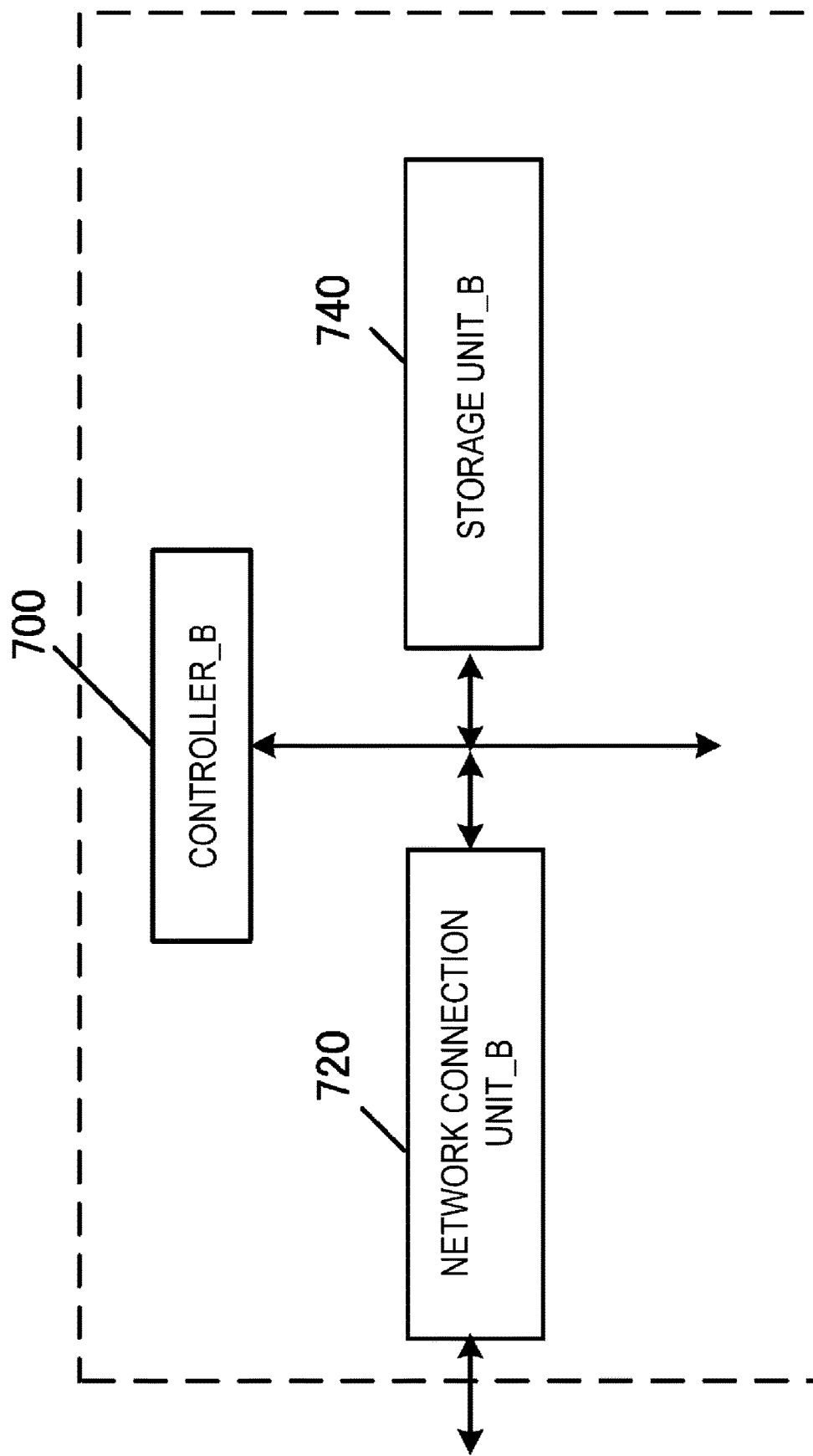
FIG. 5 is a diagram illustrating a configuration of a core network apparatus (AMF/SMF/UPF) in 5GS.

Next, an apparatus configuration example of the AMF will be described with reference to FIG. 5. The AMF includes a controller_B 700, a network connection unit_B 720, and a storage unit_B 740. The controller_B 700, the network connection unit_B 720, and the storage unit_B 740 are connected via a bus. The AMF may be a node that handles the control plane.

The controller_B 700 is a functional unit that controls operations and functions of the entire AMF. The controller_B 700 implements various types of processing in the AMF by reading and performing various programs stored in the storage unit_B 740 as necessary.

The network connection unit B 720 is a functional unit for the AMF to connect to the base station apparatus (gNB) in the 5G AN, and/or the SMF, and/or the PCF, and/or the UDM, and/or the SCEF. Specifically, the AMF can transmit and/or receive the user data and/or the control information to and/or from the base station apparatus (gNB) in the 5G AN, and/or the SMF, and/or the PCF, and/or the UDM, and/or the SCEF by using the network connection unit_B 720.

To give detailed description with reference to FIG. 2, the AMF in the 5GCN can communicate with the gNB via the N2 interface, communicate with the UDM via an N8 interface, communicate with the SMF via an N11 interface, and communicate with the PCF via an N15 interface by using the network connection unit_A 620. The AMF can perform transmission and/or reception of a NAS message to and/or from the UE via the N1 interface by using the network connection unit_A 620. Note that the N1 interface is a logical interface, and thus in actuality, the communication between the UE and the AMF is performed via the 5G AN. In a case that the AMF supports the N26 interface, the AMF can communicate with the MME via the N26 interface by using the network connection unit_A 620.

The storage unit_B 740 is a functional unit for storing programs, user data, control information, and the like that are necessary for each operation of the AMF.

Note that the AMF has a function of exchanging a control message with a RAN using the N2 interface, a function of exchanging a NAS message with the UE using the N1 interface, a function of performing encryption and integrity protection of a NAS message, a function of Registration management (RM), a function of Connection management (CM), a function of Reachability management, a function of Mobility management of the UE or the like, a function of forwarding a Session Management (SM) message between the UE and the SMF, a function of Access Authentication (Access Authorization), a Security Anchor Functionality (SEA), a function of security context management (SCM), a function of supporting the N2 interface for a Non-3GPP Interworking Function (N3IWF), a function of supporting transmission and/or reception of a NAS signal to and/or from the UE via the N3IWF, a function of authentication of the UE to be connected via the N3IWF, and the like.

In the registration management, an RM state of each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered with the network, and thus a UE context in the AMF does not have active position information and routing information for the UE. Accordingly, the AMF is in a state in which the AMF cannot reach the UE. In the RM-REGISTERED state, the UE is registered with the network, and thus the UE can receive a service that requires registration with the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, the 5GMM-REGISTERED may be a state in which each apparatus has established a 5GMM context, or may be a state in which each apparatus has established a PDU session context. Note that, in a case that each apparatus is in the 5GMM-REGISTERED, the UE_A 10 may start transmission and/or reception of the user data and the control message, or may respond to paging. In addition, note that, in a case that each apparatus is in the 5GMM-REGISTERED, the UE_A 10 may perform a registration procedure other than the registration procedure for initial registration and/or a service request procedure.

In addition, the 5GMM-DEREGISTERED may be a state in which each apparatus has not established the 5GMM context, may be a state in which the network has not been informed of the position information of the UE_A 10, or may be a state in which the network cannot reach the UE_A 10. Note that, in a case that each apparatus is in 5GMM-DEREGISTERED, the UE_A 10 may initiate the registration procedure, or may establish the 5GMM context by performing the registration procedure.

In the connection management, a CM state of each UE is managed. The CM state may be synchronized between the UE and the AMF. The CM state includes a disconnected state (CM-IDLE state) and a connected state (CM-CONNECTED state). In the CM-IDLE state, the UE is in the RM-REGISTERED state, but does not have NAS signaling connection that is established with the AMF via the N1 interface. In the CM-IDLE state, the UE does not have connection of the N2 interface (N2 connection), and connection of the N3 interface (N3 connection). In contrast, in the CM-CONNECTED state, the UE has NAS signaling connection that is established with the AMF via the N1 interface. In the CM-CONNECTED state, the UE may have connection of the N2 interface (N2 connection), and/or connection of the N3 interface (N3 connection).

In addition, in the connection management, the CM state in the 3GPP access and the CM state in the non-3GPP access may be managed separately. In this case, the CM state in the 3GPP access may include the disconnected state in the 3GPP access (CM-IDLE state over 3GPP access) and the connected state in the 3GPP access (CM-CONNECTED state over 3GPP access). In addition, the CM state in the non-3GPP access may include the disconnected state in the non-3GPP access (CM-IDLE state over non-3GPP access)

and the connected state in the non-3GPP access (CM-CONNECTED state over non-3GPP access). Note that the disconnected state may be referred to as an idle mode, and the connected state mode may be referred to as a connected mode.

Note that the CM state may be referred to as a 5GMM mode. In this case, the disconnected state may be referred to as a 5GMM disconnected mode (5GMM-IDLE mode), and the connected state may be referred to as a 5GMM connected mode (5GMM-CONNECTED mode). In addition, the disconnected state in the 3GPP access may be referred to as a 5GMM disconnected mode in the 3GPP access (5GMM-IDLE mode over 3GPP access), and the connected state in the 3GPP access may be referred to as a 5GMM connected mode in the 3GPP access (5GMM-CONNECTED mode over 3GPP access). In addition, the disconnected state in the non-3GPP access may be referred to as a 5GMM disconnected mode in the non-3GPP access (5GMM-IDLE mode over non-3GPP access), and the connected state in the non-3GPP access may be referred to as a 5GMM connected mode in the non-3GPP access (5GMM-CONNECTED mode over non-3GPP access). Note that the 5GMM disconnected mode may be referred to as an idle mode, and the 5GMM connected mode may be referred to as a connected mode.

One or more AMFs may be deployed in the core network_B. The AMF may be an NF that manages one or more Network Slice Instances (NSIs). The AMF may be a common CP function (Common Control Plane Network Function (CPNF) (CCNF)) shared between multiple NSIs.

Note that the N3IWF is an apparatus and/or a function that is deployed between the non-3GPP access and the 5GCN in a case that the UE connects to the 5GS via the non-3GPP access.

2.4. Apparatus Configuration of SMF

Next, an apparatus configuration example of the SMF will be described with reference to FIG. 5. The SMF includes a controller_B 700, a network connection unit_B 720, and a storage unit_B 740. The controller_B 700, the network connection unit_B 720, and the storage unit_B 740 are connected via a bus. The SMF may be a node that handles the control plane.

The controller_B 700 is a functional unit that controls operations and functions of the entire SMF. The controller_B 700 implements various types of processing in the SMF by reading and performing various programs stored in the storage unit_B 740 as necessary.

The network connection unit_B 720 is a functional unit for the SMF to connect to the AMF, and/or the UPF, and/or the PCF, and/or the UDM. Specifically, the SMF can transmit and/or receive the user data and/or the control information to and/or from the AMF, and/or the UPF, and/or the PCF, and/or the UDM by using the network connection unit_B 720.

To give detailed description with reference to FIG. 2, the SMF in the 5GCN can communicate with the AMF via the N11 interface, can communicate with the UPF via an N4 interface, can communicate with the PCF via an N7 interface, and can communicate with the UDM via an N10 interface, by using the network connection unit_A 620.

The storage unit_B 740 is a functional unit for storing programs, user data, control information, and the like that are necessary for each operation of the SMF.

The SMF has a function of Session Management such as establishment, modification, and release of a PDU session, a function of allocation of an IP address to the UE (IP address allocation) and management of the allocation, a function of selection and control of the UPF, a function of configuring the UPF for routing traffic to an appropriate destination (transmission destination), a function of transmitting and/or receiving an SM part of a NAS message, a function of performing a notification that downlink data has arrived (Downlink Data Notification), a function of providing SM information specific to the AN (for each AN) that is to be transmitted to the AN via the N2 interface through the AMF, a function of determining a Session and Service Continuity mode (SSC mode) for the session, a roaming function, and the like.

2.5. Apparatus Configuration of UPF

Next, an apparatus configuration example of the UPF will be described with reference to FIG. 5. The UPF includes a controller_B 700, a network connection unit_B 720, and a storage unit_B 740. The controller_B 700, the network connection unit_B 720, and the storage unit_B 740 are connected via a bus. The UPF may be a node that handles the control plane.

The controller_B 700 is a functional unit that controls operations and functions of the entire UPF. The controller_B 700 implements various types of processing in the UPF by reading and performing various programs stored in the storage unit_B 740 as necessary.

The network connection unit_B 720 is a functional unit for the UPF to connect to the base station apparatus (gNB) in the 5G AN, and/or the SMF, and/or the DN. Specifically, the UPF can transmit and/or receive the user data and/or the control information to and/or from the base station apparatus (gNB) in the 5G AN, and/or the SMF, and/or the DN by using the network connection unit_B 720.

To give detailed description with reference to FIG. 2, the UPF in the 5GCN can communicate with the gNB via the N3 interface, can communicate with the SMF via the N4 interface, can communicate with the DN via an N6 interface, and can communicate with another UPF via an N9 interface, by using the network connection unit_A 620.

The storage unit_B 740 is a functional unit for storing programs, user data, control information, and the like that are necessary for each operation of the UPF.

The UPF has a function as an anchor point with respect to intra-RAT mobility or inter-RAT mobility, a function as an external PDU session point to implement interconnection with the DN (in other words, a function of forwarding the user data as a gateway between the DN and the core network_B), a function of routing and forwarding packets, an Uplink Classifier (UL CL) function of supporting routing of multiple traffic flows for one DN, a Branching point function of supporting a multi-homed PDU session, a function of processing of Quality of Service (QoS) for the user plane, a function of verification of the uplink traffic, a function of buffering of downlink packets and triggering Downlink Data Notification, and the like.

The UPF may be a gateway for the IP communication and/or the non-IP communication. The UPF may have a function of forwarding the IP communication, and may have a function of conversion between the non-IP communication and the IP communication. In addition, multiple deployed gateways may be gateways for connecting the core network_B and a single DN. Note that the UPF may have connectivity with another NF, and may connect to each apparatus via another NF.

Note that the user plane is user data that is transmitted and/or received between the UE and the network. The user plane may be transmitted and/or received by using PDN connection or the PDU session. In addition, in a case of EPS, the user plane may be transmitted and/or received by using the LTE-Uu interface, and/or an S1-U interface, and/or an S5 interface, and/or an S8 interface, and/or an SGi interface. In addition, in a case of 5GS, the user plane may be transmitted and/or received via the interface between the UE and the NG RAN, and/or the N3 interface, and/or the N9 interface, and/or the N6 interface. In the following, the user plane may be referred to as U-Plane.

In addition, the control plane is a control message transmitted and/or received in order to perform communication control of the UE or the like. The control plane may be transmitted and/or received by using Non-Access-Stratum (NAS) signaling connection between the UE and the MME. In addition, in a case of EPS, the control plane may be transmitted and/or received by using the LTE-Uu interface and an S1-MME interface. In addition, in a case of 5GS, the control plane may be transmitted and/or received by using the interface between the UE and the NG RAN and the N2 interface. In the following, the control plane may be referred to as C-Plane.

In addition, the User Plane (U-Plane; UP) may be a communication path for transmitting and/or receiving the user data, and may include multiple bearers. In addition, the Control Plane (C-Plane; CP) may be a communication path for transmitting and/or receiving the control message, and may include multiple bearers.

2.6. Description of Other Apparatus and/or Function

Next, other apparatuses and/or functions will be described.

The PCF has a function of providing a policy rule and the like.

The UDM has a function of authentication information processing (Authentication credential processing), a function of user identification processing, a function of access authentication, a function of registration/mobility management, a function of management of subscription information (subscription management), and the like.

The PCRF is connected to the PGW and/or the PDN, and has a function of performing QoS management for data delivery and the like. For example, the PCRF performs management of QoS of the communication path between the UE_A 10 and the PDN. In addition, the PCRF may be an apparatus that creates and/or manages a Policy and Charging Control (PCC) rule and/or a routing rule used in a case that each apparatus transmits and/or receives the user data.

The HSS is connected to the MME and/or the SCEF, and has a function of performing management of subscription information and the like. The subscription information of the HSS is, for example, referred to in a case of access control of the MME. In addition, the HSS may be connected to a position management apparatus that is different from the MME.

The SCEF is connected to the DN and/or the PDN, the MME, and the HSS, and has a function of a relay apparatus that forwards the user data as a gateway that connects the DN and/or the PDN and the core network_A and the like. Note that the SCEF may be a gateway for the non-IP communication. In addition, the SCEF may have a function of conversion between the non-IP communication and the IP communication. Multiple gateways as those described above may be deployed in the core network_A. The SCEF may be configured outside of the core network, or may be configured inside of the core network.

3. Description of Terms and Identification Information and Procedures Used in Each Embodiment Terms and identification information and procedures, at least one of which is used in each embodiment, will be described in advance.

3.1. Description of Terms and Identification Information Used in Each Embodiment First, highly technical terms and identification information used in procedures, which are used in each embodiment, will be described in advance.

The network refers to at least a part of the access network_B, the core network_B, and the DN. One or more apparatuses included in at least a part of the access network_B, the core network_B, and the DN may be referred to as a network or a network apparatus. In other words, a case that the network performs transmission and/or reception of a message and/or processing may mean that the apparatus in the network (the network apparatus and/or the control apparatus) performs transmission and/or reception of the message and/or the processing. In contrast, a case that the apparatus in the network performs transmission and/or reception of a message and/or processing may mean that the network performs transmission and/or reception of the message and/or the processing.

A session management (SM) message (also referred to as a Non-Access-Stratum (NAS) SM message) may be a NAS message used in a procedure for the SM, or may be a control message transmitted and/or received between the UE_A 10 and the SMF_A 230 via the AMF_A 240. In addition, in the SM message, a PDU session establishment request message, a PDU session establishment accept message, a PDU session complete message, a PDU session reject message, a PDU session modification request message, a PDU session modification accept message, a PDU session modification response message, and the like may be included. In the procedure for the SM, a PDU session establishment procedure may be included.

A 5G System (5GS) service may be a connection service provided by using the core network_B 190. In addition, the 5GS service may be a service different from an EPS service, or may be a service similar to the EPS service.

A non 5GS service may be a service other than the 5GS service, and may include an EPS service and/or a non EPS service.

A single registration mode is a mode in which the UE_A 10 maintains a common registered state for the 5GMM state and the EMM state in a case that an N1 mode and an S1 mode are available.

A dual registration mode is a mode in which the UE_A 10 maintains registered states separately for the 5GMM state and the EMM state in a case that the N1 mode and the S1 mode are available. Note that, in a case of the dual registration mode, the UE_A 10 may be registered with the network only in the N1 mode (that is, registered only with the 5GC), may be registered with the network only in the S1 mode (that is, registered only with the EPC), or may be registered with the network in both of the N1 mode and the S1 mode (registered with both of the 5GC and the EPC).

In order to implement interworking between the 5GS and the EPC, the UE that supports both of the 5GC and the EPC NAS can operate in the single registration mode or the dual registration mode.

The S1 mode is a mode in which access to the EPC via the E-UTRAN is allowed for the UE_A 10. In other words, the S1 mode may be a mode in which transmission and/or reception of a message using the S1 interface is performed. Note that the S1 interface may include the S1-MME interface and the S1-U interface.

The N1 mode is a mode in which access to the 5GC via the 5G access network is allowed for the UE_A 10. In other words, the N1 mode may be a mode in which transmission and/or reception of a message using the N1 interface is performed.

An Access Point Name (APN) may be identification information for identifying an external network such as the core network and/or and the PDN. In addition, the APN can also be used as information for selecting a gateway that connects the core network A_90, such as a PGW_A 30 or a UPF_A 235.

A Packet Data Network (PDN) type indicates a type of PDN connection, and includes IPv4, IPv6, IPv4v6, and non-IP. In a case that IPv4 is specified, it is indicated that transmission and/or reception of data is performed by using IPv4. In a case that IPv6 is specified, it is indicated that transmission and/or reception of data is performed by using IPv6. In a case that IPv4v6 is specified, it is indicated that transmission and/or reception of data is performed by using IPv4 or IPv6. In a case that non-IP is specified, it is indicated that communication is performed by using a communication method other than the IP instead of communication using the IP.

The Protocol Data Unit/Packet Data Unit (PDU) session can be defined as association between the DN providing a PDU connectivity service and the UE, but may be connectivity established between the UE and an external gateway. In the 5GS, the UE establishes the PDU session via the access network_B and the core network_B, and can thereby perform transmission and/or reception of the user data with the DN by using the PDU session. Here, the external gateway may be the UPF, the SCEF, or the like. The UE can perform transmission and/or reception of the user data with an apparatus deployed in the DN, such as an application server, by using the PDU session.

Note that each apparatus (the UE, and/or the access network apparatus, and/or the core network apparatus) may manage one or more pieces of identification information in association with the PDU session. Note that, in these pieces of identification information, one or more of a DNN, a QoS rule, a PDU session type, application identification information. NSI identification information, access network identification information, and an SSC mode may be included, or other information may further be included. In addition, in a case that multiple PDU sessions are established, each piece of identification information associated with the PDU session may have the same contents, or may have different contents.

The Data Network Name (DNN) may be identification information for identifying an external network such as the core network and/or the DN. In addition, the DNN can also be used as information for selecting a gateway that connects the core network B 190, such as the PGW_A 30/UPF_A 235. In addition, the DNN may correspond to the Access Point Name (APN).

The Protocol Data Unit/Packet Data Unit (PDU) session type indicates a type of PDU session, and includes IPv4, IPv6, Ethernet, and Unstructured. In a case that IPv4 is specified, it is indicated that transmission and/or reception of data is performed by using IPv4. In a case that IPv6 is specified, it is indicated that transmission and/or reception of data is performed by using IPv6. In a case that Ethernet is specified, it is indicated that transmission and/or reception of an Ethernet frame is performed. Ethernet may indicate that communication using the IP is not performed. In a case that Unstructured is specified, it is indicated that data is transmitted to and/or received from the application server or the like located in the DN by using Point-to-Point (P2P) tunneling technique. As the P2P tunneling technique, for example, encapsulation technique of UDP/IP may be used. Note that the PDU session type may include the IP in addition to the above. The IP can be specified in a case that the UE can use both of IPv4 and IPv6.

The network slice (NS) is a logical network that provides specific network capability and network characteristics. The UE and/or the network can support a network slice (NW slice; NS) in the 5GS.

The network slice instance (NSI) includes an instance (entity) of a network function (NF) and a set of necessary resources, and forms a network slice to be deployed. Here, the NF is a processing function in the network, and is adopted or defined in 3GPP. The NSI is an entity of the NS, one or more of which are configured in the core network_B. The NSI may include a virtual Network Function (NF) that is generated by using a Network Slice Template (NST). Here, the NST is associated with a resource request for providing a required communication service or capability, and is a logical expression of one or more NFs. In other words, the NSI may be a set including multiple NFs present in the core network_B 190. The NSI may be a logical network configured for separating the user data that is delivered through a service or the like. The NS may include one or more NFs. The NF included in the NS may or may not be an apparatus shared with another NS. The UE and/or the apparatus in the network can be assigned to one or more NSs, based on registration information such as NSSAI, and/or S-NSSAI, and/or a UE usage type, and/or one or more NSI IDs, and/or an APN. Note that the UE usage type is a parameter value included in the registration information of the UE, which is used to identify the NSI. The UE usage type may be stored in the HSS. The AMF may select the SMF and the UPF, based on the UE usage type.

The Single Network Slice Selection Assistance Information (S-NSSAI) is information for identifying the NS. The S-NSSAI may include only a Slice/Service type (SST), or may include both of the SST and a Slice Differentiator (SD). Here, the SST is information indicating operation of the NS expected in terms of functions and services. The SD may be information for interpolating the SST in a case that one NSI is selected out of multiple NSIs indicated in the SST. The S-NSSAI may be information specific to each PLMN, or may be standard information standardized among PLMNs. The network may store one or more pieces of S-NSSAI in the registration information of the UE as default S-NSSAI. Note that, in a case that the S-NSSAI is the default S-NSSAI, the network may provide the NS related to the UE in a case that the UE does not transmit active S-NSSAI to the network in the Registration request message.

The Network Slice Selection Assistance Information (NSSAI) is a set of pieces of S-NSSAI. Each piece of S-NSSAI included in the NSSAI is information for assisting the access network or the core network to select the NSI. The UE may store the NSSAI allowed by the network for each PLMN. The NSSAI may be information used to select the AMF.

The Session and Service Continuity (SSC) mode indicates a mode of Session and Service Continuity supported by a system and/or each apparatus in the 5G system (5GS). More specifically, the SSC mode may be a mode indicating a type of session and service continuity supported by the PDU session established between the UE_A 10 and the UPF. Note that the SSC mode may be a mode indicating a type of session and service continuity configured for each PDU session. In addition, the SSC mode may include three modes, namely SSC mode 1, SSC mode 2, and SSC mode 3. Note that the SSC mode associated with the PDU session may not be changed while the PDU session continues.

5GMM-CONNECTED mode with RRC inactive indication is a state indicating that the state of the NAS layer is a connected state regardless of the RRC layer being in an inactive state. In other words, the 5GMM-CONNECTED mode with RRC inactive indication is a state in which a radio bearer has been released while maintaining NAS signaling connection and/or the context of NAS signaling connection.

Note that the support of the 5GMM-CONNECTED mode with RRC inactive indication may mean that maintaining of the state of the NAS layer in the connected state is supported even in a case that a notification indicating that the RRC layer has become inactive is received from a lower layer. In addition, the use of the 5GMM-CONNECTED mode with RRC inactive indication may mean that the state of the NAS layer is maintained in the connected state even in a case that a notification indicating that the RRC layer has become inactive is received from the lower layer.

A tracking area is a single or multiple ranges that can be represented by position information of the UE_A 10, which is managed by the core network. The tracking area may include multiple cells. In addition, the tracking area may be a range in which the control message such as paging is broadcast, or may be a range in which the UE_A 10 can move without performing a handover procedure. In addition, the tracking area may be a routing area, may be a location area, or may be an area similar to these. In the following, the tracking area may be a Tracking Area (TA).

The 5G Local Area Data Network (5GLAN) service is a service that provides private communication in the 5G system. In the following, the 5GLAN service may be referred to as a 5GLAN.

The 5GLAN group is a set of UEs that perform private communication. Here, the private communication may be communication performed between two or more UEs that belong to a limited set of UEs. In addition, the private communication may be communication implemented in the 5G system. In addition, the private communication may be the IP communication implemented by the Internet Protocol (IP), or may be the non-IP communication implemented by a protocol other than the IP. Here, the non-IP communication may be, for example, communication implemented by Ethernet (trade name).

The PDU session for the 5GLAN (PDU session for 5GLAN) is a PDU session that is established in order to use the 5GLAN service. The PDU session for the 5GLAN may be a PDU session that is used for user data communication using a 5GLAN group ID and the 5GLAN service. In addition, the PDU session for the 5GLAN may be a PDU session that is associated with the 5GLAN group ID. In other words, the UE may be able to establish the PDU session for the 5GLAN by using a specific 5G group ID.

In addition, the PDU session for the 5GLAN may be a PDU session that can be established only in the 5GLAN service area. In other words, the UE may be able to establish the PDU session for the 5GLAN by using a specific 5G group ID in a specific location.

The 5GLAN group ID is information for identifying the 5GLAN group that is created on the network. The 5GLAN group ID may be identification information used in a case that the 5GLAN service is used. In addition, the 5GLAN group ID may be information for identifying the 5GLAN in a case that user data communication using the 5GLAN service is performed. In addition, the 5GLAN group ID may be identification information associated with the PDU session that is established in a case that the 5GLAN service is used. In other words, the 5GLAN group ID may be information used in a case that the PDU session for the 5GLAN is established. Here, the 5GLAN group ID may be implemented by the DNN, or may be implemented by a Virtual LAN (VLAN) ID. In addition, the 5GLAN group ID may be implemented by identification information other than the DNN and the VLAN ID. In addition, the 5GLAN group ID may be implemented by information that is used to identify the LAN.

The 5GLAN service area is an area in which the PDU session for the 5GLAN can be established. The 5GLAN service area may be an area in which the 5GLAN service can be used. In addition, the 5GLAN service area may be an area indicated by 5GLAN service area information. Here, the 5GLAN service area information may be information for identifying the 5GLAN service area, may be provided as a set of tracking areas, or may be provided as a Tracking area identity (TAI) list.

In addition, the 5GLAN service area may be an area that includes the tracking area that belongs to a registration area to which the UE is currently connected. In other words, the 5GLAN service area may be an area that includes one or multiple tracking areas. In this case, the 5GLAN service area information may be a tracking area ID list that includes one or multiple tracking area IDs.

In addition, the 5GLAN service area may be an area that is covered by a part of base stations in the tracking area. In addition, the 5GLAN service area may be an area having a size other than that of the area including the tracking area, or may be an area that is not dependent on the tracking area. In other words, the 5GLAN service area may be an area that includes one or multiple tracking areas, or may be an area different from the area that includes one or multiple tracking areas. In this case, the 5GLAN service area information may be information that requires assistance of the Radio Access Network (RAN), or may be information that does not require the assistance of the RAN. Here, the information that requires the assistance of the RAN may be information of a cell, or may be information of a base station. In addition, the information that requires the assistance of the RAN may be a cell ID, or may be a base station ID. In addition, the information that requires the assistance of the RAN is not limited to these, and may be information defined by the RAN. In addition, the information that does not require the assistance of the RAN may be physical position information, or may be position information that can be acquired by an application. In addition, the information that does not require the assistance of the RAN is not limited to these, and may be information that can be acquired outside of the RAN. Here, the RAN may be referred to as an access network. Conversely, the access network may be referred to as a RAN.

1st identification information is information indicating whether or not the UE supports the 5GLAN service. The 1st identification information may be bits indicating that the 5GLAN service is supported, or may be bits indicating that the 5GLAN service is not supported. Here, the expression that the UE supports the 5GLAN service may mean that the UE supports the use of the 5GLAN service. In addition, the 1st identification information may be bits configuring a 5GMM capability information element, which indicates capability of the UE in 5G. In addition, the 1st identification information may be information that is selected and determined based on capability information of the UE, and/or a configuration of the UE, and/or a state of the UE, and/or a user policy, and/or a request of an application.

2nd identification information is information indicating that the UE requests the 5GLAN service. Here, the expression that the UE requests the 5GLAN service may mean that the UE requests the use of the 5GLAN service. In addition, the 1st identification information and the 2nd identification information may be transmitted and/or received as the same piece of identification information, or may be transmitted and/or received as separate pieces of identification information. In addition, the 2nd identification information may be information that is selected and determined based on capability information of the UE, and/or a configuration of the UE, and/or a state of the UE, and/or a user policy, and/or a request of an application. The 2nd identification information may be information indicating preference of the 5GLAN service. In addition, the 2nd identification information may be information for requesting one or multiple group IDs, which are allowed and/or configured by the network.

3rd identification information is information indicating the 5GLAN group ID that is requested by the UE. In the 3rd identification information, information indicating one or multiple 5GLAN group IDs may be included. In addition, the 3rd identification information may be information that is selected and determined based on capability information of the UE, and/or a configuration of the U E, and/or a state of the UE, and/or a user policy, and/or a request of an application. For example, the 3rd identification information may be information that is selected and determined based on information of the 5GLAN that is stored by the UE. Specifically, the 3rd identification information may be selected and determined based on one or multiple 5GLAN group IDs allowed by the network and/or one or multiple configured 5GLAN group IDs. In addition, the 3rd identification information may be selected and determined based on one or multiple 5GLAN group IDs rejected by the network and/or a set of 5GLAN group IDs rejected by the network, the 5GLAN group IDs and/or the set of 5GLAN group IDs being stored in the UE. In other words, the 3rd identification information may be selected and determined so that the 5GLAN group IDs included in the set of 5GLAN group IDs rejected by the network corresponding to the current area of the UE and/or the current PLMN are not included.

In addition, the 3rd identification information may be information that is selected and determined based on information received from the network. For example, the 3rd information may be information including one or multiple group IDs out of the 5GLAN group IDs that are included in the 13th information, and/or 15th identification information, and/or 61st identification information. In addition, the 3rd identification information may be information including one or multiple 5GLAN group IDs other than the 5GLAN group IDs that are included in 14th identification information. In addition, the 3rd identification information may be one or multiple 5GLAN group IDs that are stored by the UE in advance.

11th identification information is information indicating whether or not the network supports the 5GLAN service. The 11th identification information may be a bit indicating that the 5GLAN service is supported, or may be a bit indicating that the 5GLAN service is not supported. Here, the expression that the network supports the 5GLAN service may mean that the network supports the use of the 5GLAN service. In addition, the 11th identification information may be a bit configuring a 5GS network function support information element (5GS network feature support information element), which indicates capability of the network in 5G.

In addition, the 11th identification information may be information that is selected and determined by the network, based on identification information received from the UE, and/or capability information of the network, and/or an operator policy, and/or a state of the network, and/or registration information of the user, and the like. In addition, the 11th identification information may be information that is selected and determined based on other identification information selected by the network in the present procedure.

12th identification information is information indicating whether or not the network has accepted the request for the 5G LAN service. The 12th identification information may be a bit indicating that the request for the 5GLAN service has been accepted, or may be a bit indicating that the request for the 5GLAN service has not been accepted. Here, the expression that the network has accepted the request for the 5GLAN service or that the network has allowed the service of the 5GLAN may mean that the network accepts and/or allows the use of the 5GLAN service that is requested by the UE. In addition, the 11th identification information and the 12th identification information may be transmitted and/or received as the same piece of identification information, or may be transmitted and/or received as separate pieces of identification information.

In addition, the 12th identification information may be information that is selected and determined by the network, based on identification information received from the UE, and/or capability information of the network, and/or an operator policy, and/or a state of the network, and/or registration information of the user, and the like. In addition, the 12th identification information may be information that is selected and determined based on other identification information selected by the network in the present procedure.

13th identification information is information indicating the 5GLAN group ID that is allowed by the network. In the 13th identification information, information indicating one or multiple 5GLAN group IDs may be included. Here, the network may include, in the 13th identification information, one or multiple 5GLAN group IDs allowed by the network out of the 5GLAN group IDs requested by the UE. In addition, the network may include, in the 13th identification information, one or multiple 5GLAN group IDs that are configured in advance.

In addition, the 13th identification information may be information that is selected and determined by the network, based on identification information received from the UE, and/or capability information of the network, and/or an operator policy, and/or a state of the network, and/or registration information of the user, and the like. In addition, the 13th identification information may be information that is selected and determined based on other identification information selected by the network in the present procedure. In addition, the 13th identification information may be transmitted and/or received in a case that the network supports the 5GLAN service, or may be transmitted and/or received in a case that the network allows the 5GLAN service.

The 14th identification information is information indicating the 5GLAN group ID that is rejected by the network. In the 14th identification information, information indicating one or multiple 5GLAN group IDs may be included. Here, the network may include, in the 14th identification information, one or multiple 5GLAN group IDs rejected by the network out of the 5GLAN group IDs requested by the UE.

In addition, the 14th identification information may be information that is selected and determined by the network, based on identification information received from the UE, and/or capability information of the network, and/or an operator policy, and/or a state of the network, and/or registration information of the user, and the like. In addition, the 14th identification information may be information that is selected and determined based on other identification information selected by the network in the present procedure. In addition, the 14th identification information may be transmitted and/or received in a case that the network supports the 5GLAN service, or may be transmitted and/or received in a case that the network allows the 5GLAN service.

The 15th identification information is information indicating the 5GLAN group ID that is configured by the network. In the 15th identification information, information indicating one or multiple 5GLAN group IDs may be included.

In addition, the 15th identification information may be information that is selected and determined by the network, based on identification information received from the UE, and/or capability information of the network, and/or an operator policy, and/or a state of the network, and/or registration information of the user, and the like. In addition, the 15th identification information may be information that is selected and determined based on other identification information selected by the network in the present procedure. In addition, the 15th identification information may be transmitted and/or received in a case that the network supports the 5GLAN service, or may be transmitted and/or received in a case that the network allows the 5GLAN service.

16th identification information is information indicating the 5GLAN service area. In the 16th identification information, information indicating one or multiple 5GLAN service areas may be included. In addition, the 16th identification information may be associated with the 5GLAN group ID indicated by the 13th identification information, may be associated with the 5GLAN group ID indicated by the 14th identification information, or may be associated with the 5GLAN group ID indicated by the 15th identification information.

In addition, in the 16th identification information, information indicating an area in which establishment of the PDU session for the 5GLAN is not allowed may also be included. Note that the information indicating the area in which establishment of the PDU session for the 5GLAN is not allowed and the information indicating the area in which establishment of the PDU session for the 5GLAN is allowed may be transmitted and/or received by being included in the same piece of information, or may be transmitted and/or received as different pieces of information.

In addition, the 16th identification information may be information that is selected and determined by the network, based on identification information received from the UE, and/or capability information of the network, and/or an operator policy, and/or a state of the network, and/or registration information of the user, and the like. In addition, the 16th identification information may be information that is selected and determined based on other identification information selected by the network in the present procedure. In addition, the 16th identification information may be transmitted and/or received in a case that the network supports the 5GLAN service, or may be transmitted and/or received in a case that the network allows the 5GLAN service.

17th identification information is information of the 5GLAN. Here, the information of the 5GLAN may be information including the 5GLAN group ID and the 5GLAN service area. More specifically, the information of the 5GLAN may be information including one or multiple 5GLAN group IDs and one or multiple 5GLAN service areas associated with respective 5GLAN group IDs. In addition, the information of the 5GLAN may be information indicating correspondence between the 5GLAN group ID and the 5GLAN service area.

Specifically, the 17th identification information may be information including the 13th identification information and the 16th identification information. In addition, the 17th identification information may be information including the 14th identification information and the 16th identification information. In addition, the 17th identification information may be information including the 15th identification information and the 16th identification information.

In addition, the 17th identification information may be information in which the 5GLAN group ID indicated by the 13th identification information and the 5GLAN service area indicated by the 16th identification information are associated with each other. In addition, the 17th identification information may be information in which the 5GLAN group ID indicated by the 14th identification information and the 5GLAN service area indicated by the 16th identification information are associated with each other. In addition, the 17th identification information may be information in which the 5GLAN group ID indicated by the 15th identification information and the 5GLAN service area indicated by the 16th identification information are associated with each other.

In addition, the 17th identification information may be information that is selected and determined by the network, based on identification information received from the UE, and/or capability information of the network, and/or an operator policy, and/or a state of the network, and/or registration information of the user, and the like. In addition, the 17th identification information may be information that is selected and determined based on other identification information selected by the network in the present procedure. In addition, the 17th identification information may be transmitted and/or received in a case that the network supports the 5GLAN service, or may be transmitted and/or received in a case that the network allows the 5GLAN service.

In addition, the information of the 5GLAN may be information including one or multiple 5GLAN group IDs and the PLMNs and/or the 5GLAN service areas that are associated with respective 5GLAN group IDs. In addition, the information of the 5GLAN may be information indicating correspondence between the 5GLAN group ID and the PLMN and/or the 5GLAN service area. For example, the 17th identification information may be information indicating correspondence between the 5GLAN group ID rejected by the network and the PLMN and/or the 5GLAN service area, which are determined based on the 14th identification information and 18th identification information, and a set of such pieces of information. Note that each apparatus may manage or store the set of pieces of information indicating correspondence between the 5GLAN group ID rejected by the network and the PLMN and the set of pieces of information indicating correspondence between the 5GLAN group ID rejected by the network and the 5G service area as different sets. Note that each apparatus may manage or store the set of pieces of information indicating correspondence between the 5GLAN group ID rejected by the network and the PLMN and/or the 5GLAN service area for each PLMN and/or for each 5GLAN service area. Note that, as described above, the set of pieces of information indicating correspondence between the 5GLAN group ID rejected by the network and the PLMN and/or the 5GLAN service area stored by each apparatus may be used as a set of 5GLAN group IDs rejected by the network.

In addition, of the 17th identification information, the information including the 5GLAN group ID allowed by the network and the information including the 5GLAN group ID rejected by the network may be transmitted and/or received as different pieces of information.

The 18th identification information is a cause value indicating a cause why the request of the UE is not allowed. The 18th identification information may be information indicating a cause why the requested 5GLAN group ID has been rejected. Here, the requested 5GLAN group ID may be the 5GLAN group ID indicated by the 3rd identification information.

In addition, the 18th identification information may be information indicating that the requested 5GLAN group ID is not allowed in the current PLMN. In addition, the 18th identification information may be information indicating that the requested 5GLAN group ID is not allowed in the area to which the UE currently belongs. Note that the area to which the UE currently belongs may be an area including one or multiple tracking areas.

In addition, the 18th identification information may be transmitted and/or received in association with the 14th identification information. In addition, in a case that there are multiple 5GLAN group IDs indicated by the 14th identification information, the 18th identification information may be transmitted and/or received for each 5GLAN group ID. In addition, the 14th identification information and the 18th identification information may be transmitted and/or received as the same piece of identification information, or may be transmitted and/or received as separate pieces of identification information.

In addition, the 18th identification information may be information that is selected and determined by the network, based on identification information received from the UE, and/or capability information of the network, and/or an operator policy, and/or a state of the network, and/or registration information of the user, and the like.

21st identification information is a cause value indicating a cause why the request of the UE is not allowed. The 21st identification information may be a 5GMM cause value. In addition, the 21st identification information may be information indicating that the 5GLAN service is not supported, or may be information indicating that the 5GLAN service is not allowed.

In addition, the 21st identification information may be information indicating that the 5GLAN service is not supported and/or the 5GLAN service is not allowed in the current PLMN. In addition, the 21st identification information may be information indicating that the 5GLAN service is not supported and/or the 5GLAN service is not allowed in the area to which the UE currently belongs. Note that the area to which the UE currently belongs may be an area including one or multiple tracking areas.

In addition, the 21st identification information may be information that is selected and determined by the network, based on identification information received from the UE, and/or capability information of the network, and/or an operator policy, and/or a state of the network, and/or registration information of the user, and the like.

31st identification information is information indicating the 5GLAN group ID that is requested by the UE. The 31st identification information may be information indicating the 5GLAN group ID that is associated with the PDU session of which establishment is requested by the UE. In addition, the 31st identification information may be information that is selected and determined based on capability information of the UE, and/or a configuration of the UE, and/or a state of the UE, and/or a user policy, and/or a request of an application. In addition, the 31st identification information may be information that is selected and determined based on information received from the network, or may be information that is selected and determined based on information stored by the UE.

32nd identification information is information indicating a PDU session type that is requested by the UE. The 32nd identification information may be information indicating a PDU session type that is associated with the PDU session of which establishment is requested by the UE. Here, the PDU session type indicated by the 32nd identification information may be IPv4, may be IPv6, or may be IPv4v6. In addition, the PDU session type indicated by the 32nd identification information may be Ethernet, or maybe Unstructured.

In addition, the 32nd identification information may be information that is selected and determined based on capability information of the UE, and/or a configuration of the UE, and/or a state of the UE, and/or a user policy, and/or a request of an application. In addition, the 32nd identification information may be information that is selected and determined based on information received from the network, or may be information that is selected and determined based on information stored by the UE.

41st identification information is information indicating the 5GLAN group ID that is accepted by the network. The 41st identification information may be information indicating the 5GLAN group ID that is associated with the PDU session of which establishment is accepted by the network. In addition, the 41st identification information may include information indicating that the UE is to be added to the 5GLAN group. In addition, the 41st identification information may be transmitted and/or received in a case that the network supports the 5GLAN service, or may be transmitted and/or received in a case that the network allows the 5GLAN service.

In addition, the 41st identification information may be information that is selected and determined by the network, based on identification information received from the UE, and/or capability information of the network, and/or an operator policy, and/or a state of the network, and/or registration information of the user, and the like. In addition, the 41st identification information may be information that is selected and determined based on other identification information selected by the network in the present procedure.

42nd identification information is information indicating the PDU session type that is accepted by the network. The 42nd identification information may be information indicating the PDU session type that is associated with the PDU session of which establishment is accepted by the network. Here, the PDU session type indicated by the 42nd identification information may be IPv4, may be IPv6, or may be IPv4v6. In addition, the PDU session type indicated by the 42nd identification information may be Ethernet, or maybe Unstructured.

In addition, the 42nd identification information may be information that is selected and determined by the network, based on identification information received from the UE, and/or capability information of the network, and/or an operator policy, and/or a state of the network, and/or registration information of the user, and the like. In addition, the 42nd identification information may be information that is selected and determined based on other identification information selected by the network in the present procedure.

51st identification information is a cause value indicating a cause why the request of the UE is not allowed. The 51st identification information may be a 5GSM cause value. In addition, the 51st identification information may be information indicating that the requested 5GLAN group ID is not allowed. Here, the requested 5GLAN group ID may be the 5GLAN group ID indicated by the 31st identification information.

In addition, the 51st identification information may be information indicating that the requested 5G LAN group ID is not allowed in the current PLMN. In addition, the 51st identification information may be information indicating that the requested 5GLAN group ID is not allowed in the area to which the UE currently belongs. Note that the area to which the UE currently belongs may be an area including one or multiple tracking areas.

In addition, the 51st identification information may be information that is selected and determined by the network, based on identification information received from the UE, and/or capability information of the network, and/or an operator policy, and/or a state of the network, and/or registration information of the user, and the like.

61st identification information is information indicating a new 5GLAN group ID. In the 61st identification information, information indicating one or multiple 5GLAN group IDs may be included. The 61st identification information may be information indicating that a change of the 5GLAN group ID stored by the UE and/or the network is required. In addition, the 61st identification information may be information indicating a changed 5GLAN group ID. In addition, the 61st identification information may be information indicating that a change of the 5GLAN group ID allowed by the network is required. In addition, the 61st identification information may be information indicating a changed 5GLAN group ID allowed by the network. In addition, the 61st identification information may be associated with the 5G LAN service area indicated by 62nd identification information.

In addition, the 61st identification information may be information indicating the 5GLAN group ID different from the currently stored 5GLAN group ID. In other words, the 61st identification information may be information indicating the 5GLAN group ID different from the 5GLAN group ID indicated by previously transmitted and/or received identification information.

In addition, the 61st identification information may be empty information. In other words, the 61st identification information may be information indicating release or deletion of the information indicating the 5G LAN group ID stored by the UE and/or the network. In addition, the 61st identification information may be information indicating release of the PDU session for the 5GLAN. In addition, the 61st identification information may include information indicating whether or not a corresponding 5GLAN group has been deleted. In addition, the 61st identification information may include information indicating whether or not the UE has been removed from a corresponding 5GLAN group.

In addition, the 61st identification information may include information indicating that the 5GLAN group is newly created. In addition, the 61st identification information may include information indicating that the UE has been added to a corresponding 5GLAN group. In addition, the 61st identification information may include information indicating that the UE has been added to an active 5GLAN group.

In addition, the 61st identification information may be information that is selected and determined by the network, based on a request from an application, and/or a state change of the network, and/or previously transmitted and/or received identification information, and/or information stored by the network, and/or capability information of the network, and/or an operator policy, and/or a state of the network, and/or registration information of the user, and the like. In addition, the 61st identification information may be information that is selected and determined based on other identification information selected by the network in the present procedure.

The 62nd identification information is information indicating a new 5GLAN service area. In the 62nd identification information, information indicating one or multiple 5GLAN service areas may be included. The 62nd identification information may be information indicating that a change of the 5GLAN service area stored by the UE and/or the network is required. In addition, the 62nd identification information may be information indicating a changed 5GLAN service area. In addition, the 62nd identification information may be associated with the 5GLAN group ID indicated by the 61st identification information.

In addition, the 62nd identification information may be information indicating the 5GLAN service area different from the currently stored 5GLAN service area. In other words, the 62nd identification information may be information indicating the 5GLAN service area different from the 5GLAN service area indicated by the previously transmitted and/or received identification information.

In addition, the 62nd identification information may be empty information. In other words, the 62nd identification information may be information indicating release or deletion of the information indicating the 5GLAN service area stored by the UE and/or the network. In addition, the 62nd identification information may be information indicating release or deletion of the information of the 5GLAN associated with the 5GLAN service area stored by the UE and/or the network. In addition, the 62nd identification information may be information indicating release of the PDU session for the 5GLAN.

In addition, the 62nd identification information may include information indicating that the 5GLAN group has been newly created. In addition, the 62nd identification information may include information indicating that the UE has been added to a corresponding 5GLAN group.

In addition, the 62nd identification information may be information that is selected and determined by the network, based on a request from an application, and/or a state change of the network, and/or previously transmitted and/or received identification information, and/or information stored by the network, and/or capability information of the network, and/or an operator policy, and/or a state of the network, and/or registration information of the user, and the like. In addition, the 62nd identification information may be information that is selected and determined based on other identification information selected by the network in the present procedure.

63rd identification information is information indicating new information of a 5GLAN. The 63rd identification information may be information indicating that a change of the information of the 5GLAN stored by the UE and/or the network is required. In addition, the 63rd identification information may be information indicating information of a changed 5GLAN. Specifically, the 63rd identification information may be information including the 61st identification information and the 62nd identification information. In addition, the 63rd identification information may be information in which the 5GLAN group ID indicated by the 61st identification information and the 5GLAN service area indicated by the 62nd identification information are associated with each other.

In addition, the 63rd identification information may be information indicating the information of the 5GLAN different from the information of the 5GLAN currently stored by the UE and/or the network. In other words, the 63rd identification information may be information indicating the information of the 5GLAN different from the information of the 5GLAN indicated by the previously transmitted and/or received identification information.

In addition, the 63rd identification information may be empty information. In other words, the 63rd identification information may be information indicating release or deletion of the information of the 5GLAN stored by the UE and/or the network. In addition, the 63rd identification information may be information indicating release of the PDU session for the 5GLAN. In addition, the 63rd identification information may include information indicating whether or not a corresponding 5GLAN group has been deleted. In addition, the 63rd identification information may include information indicating whether or not the UE has been removed from a corresponding 5GLAN group.

In addition, the 63rd identification information may include information indicating that the 5GLAN group has been newly created. In addition, the 63rd identification information may include information indicating that the UE has been added to a corresponding 5GLAN group.

In addition, the 63rd identification information may be information that is selected and determined by the network, based on a request from an application, and/or a state change of the network, and/or previously transmitted and/or received identification information, and/or information stored by the network, and/or capability information of the network, and/or an operator policy, and/or a state of the network, and/or registration information of the user, and the like. In addition, the 63rd identification information may be information that is selected and determined based on other identification information selected by the network in the present procedure.

71st identification information is a cause value indicating a cause why the PDU session is released. The 71st identification information may be a 5GSM cause value. In addition, the 71st identification information may be information indicating that the established PDU session for the 5GLAN is no longer available. In addition, the 71st identification information may be information indicating that the 5GLAN group ID that is associated with the established PDU session for the 5GLAN is no longer available. In addition, the 71st identification information may be information indicating that the 5GLAN group that is associated with the established PDU session for the 5GLAN has been deleted. In addition, the 71st identification information may be information indicating that the UE has been removed from the 5GLAN group that is associated with the established PDU session for the 5GLAN.

In addition, the 71st identification information may be information indicating that the established PDU session for the 5GLAN is temporarily unavailable. In addition, the 71st identification information may be information indicating that the established PDU session for the 5GLAN is no longer available in the current PLMN. In addition, the 71st identification information may be information indicating that the established PDU session for the 5GLAN is no longer available in the area to which the UE currently belongs. Note that the area to which the UE currently belongs may be an area including one or multiple tracking areas.

In addition, the 71st identification information may be information that is selected and determined by the network, based on a request from an application, and/or a state change of the network, and/or capability information of the network, and/or an operator policy, and/or a state of the network, and/or registration information of the user, and the like.

3.2. Description of Procedures Used in Each Embodiment

Next, procedures used in each embodiment will be described. Note that the procedures used in each embodiment include a Registration procedure, a PDU session establishment procedure, a UE configuration update procedure (Generic UE configuration update procedure), and a PDU session management procedure. In the following, each procedure will be described. Note that the PDU session management procedure may be a PDU session release procedure and/or a PDU session modification procedure.

Note that, as illustrated in FIG. 2, each embodiment will be described by taking an example of a case that each of combinations of the HSS and the UDM, the PCF and the PCRF, the SMF and the PGW-C, and the UPF and the PGW-U is configured as the same apparatus (that is, the same physical hardware, or the same logical hardware, or the same software). However, the details described in the present embodiment can also be applied to a case that these are configured as different apparatuses (that is, different pieces of physical hardware, or different pieces of logical hardware, or different pieces of software). For example, between these, transmission and/or reception of data may be directly performed, data may be transmitted and/or received via the N26 interface between the AMF and the MME, or data may be transmitted and/or received via the UE.

3.2.1. Registration Procedure

First, the Registration procedure will be described with reference to FIG. 6. The registration procedure is a procedure in 5GS. In the following, the present procedure refers to a registration procedure. The registration procedure is a procedure for registration with the access network_B, and/or the core network_B, and/or the DN, which is initiated by the UE. In a case that the UE is not registered with the network, for example, the UE can perform the present procedure at any timing such as the timing of turning on power. In other words, the UE can initiate the present procedure at any timing as long as the UE is in the deregistered state (RM-DEREGISTERED state). Each apparatus (in particular, the UE and the AMF) can transition to the registered state (RM-REGISTERED state), based on completion of the registration procedure.

In addition, the registration procedure may be a procedure for updating position registration information of the UE in the network, and/or regularly giving notification of the state of the UE from the UE to the network, and/or updating a specific parameter related to the UE in the network.

In a case that the UE performs mobility across TAs, the UE may initiate the registration procedure. In other words, in a case that the UE moves to a TA different from the TA indicated in the stored TA list, the UE may initiate the registration procedure. In addition, the UE may initiate the present procedure in a case that a running timer expires. In addition, the UE may initiate the registration procedure in a case that update of the context of each apparatus is necessary due to disconnection and deactivation of the PDU session. In addition, the UE may initiate the registration procedure in a case that there is a change in the capability information and/or the preference related to PDU session establishment of the UE. In addition, the UE may regularly initiate the registration procedure. In addition, the UE may initiate the registration procedure, based on completion of the UE configuration update procedure, or based on completion of the registration procedure, or based on completion of the PDU session establishment procedure, or based on completion of the PDU session management procedure, or based on information received from the network in each procedure. Note that the timing is not limited to these, and the UE can perform the registration procedure at any timing.

First, the UE transmits a Registration request message to the AMF (S800) (S802) (S804) to initiate the registration procedure. Specifically, the UE transmits an RRC message including the Registration request message to the 5G AN (or the gNB) (S800). Note that the Registration request message is a NAS message. The RRC message may be a control message that is transmitted and/or received between the UE and the 5G AN (or the gNB). The NAS message is processed in the NAS layer, and the RRC message is processed in the RRC layer. Note that the NAS layer is a layer higher than the RRC layer.

Here, the UE can transmit one or more pieces of identification information out of at least the 1st identification information to the 3rd identification information being included in the Registration request message and/or the RRC message, but can transmit the one or more pieces of identification information being included in a control message different from these, for example, a control message of a layer (for example, the MAC layer, the RLC layer, or the PDCP layer) that is lower than the RRC layer. Note that, by transmitting these pieces of identification information, the UE may indicate that the UE supports each function, may indicate the request of the UE, or may indicate both of these. In addition, in a case that multiple pieces of identification information are transmitted and/or received, two or more pieces of identification information of these pieces of identification information may be configured as one or more pieces of identification information. Note that the information indicating support of each function and the information indicating the request for the use of each function may be transmitted and/or received as the same piece of identification information, or may be transmitted and/or received as different pieces of identification information.

In a case that the UE supports the 5GLAN service, the UE may configure information indicating that the 5GLAN service is supported for the 1st identification information, or may transmit the 1st identification information indicating that the 5GLAN service is supported being included in the Registration request message. In contrast, in a case that the UE does not support the 5GLAN service, the UE may configure the information indicating that the 5GLAN service is not supported for the 1st identification information, may transmit the 1st identification information indicating that the 5GLAN service is not supported being included in the Registration request message, or may not transmit the 1st identification information. In addition, as long as the present procedure is not the registration procedure for periodically giving notification of the state of the UE from the UE to the network, the UE may transmit the 1st identification information. Alternatively, even in a case that the present procedure is the registration procedure for periodically giving notification of the state of the UE from the UE to the network, the UE may transmit the 1st identification information.

In addition, in a case that the UE requests the 5GLAN service, the UE may configure information indicating the request for the 5GLAN service for the 2nd identification information, or may transmit the 2nd identification information indicating the request for the 5GLAN service being included in the Registration request message. In contrast, in a case that the UE does not request the 5GLAN service, the UE may not transmit the 2nd identification information.

In addition, in a case that the UE requests preferential use of the 5GLAN service, the UE may configure information indicating the preference of the 5GLAN service for the 2nd identification information, or may transmit the 2nd identification information indicating the preference of the 5GLAN service being included in the Registration request message. In contrast, in a case that the UE does not request preferential use of the 5GLAN service, the UE may not transmit the 2nd identification information.

In addition, in a case that the UE requests notification of the 5GLAN group allowed by the network, the UE may configure information indicating the request for the 5GLAN group ID for the 2nd identification information, or may transmit the 2nd identification information indicating the request for the 5GLAN group ID being included in the Registration request message. In contrast, in a case that the UE does not request notification of the 5GLAN group allowed by the network, the UE may not transmit the 2nd identification information.

In addition, in a case that the UE supports the 5GLAN service and/or requests the 5GLAN service, the UE may configure one or multiple 5GLAN group IDs requested by the UE for the 3rd identification information, or may transmit the 3rd identification information indicating the one or multiple 5GLAN group IDs requested by the UE being included in the Registration request message.

In addition, in a case that the UE stores one or multiple 5GLAN group IDs, the UE may configure one or multiple 5GLAN group IDs out of one or multiple 5GLAN group IDs stored by the UE as the 3rd identification information, or may transmit the 3rd identification information indicating the one or multiple 5GLAN group IDs out of the one or multiple 5GLAN group IDs stored by the UE being included in the Registration request message. In contrast, in a case that the UE does not store the 5GLAN group ID, the UE may not transmit the 3rd identification information.

Note that the one or multiple 5G LAN group IDs stored by the UE may be information acquired and stored by the UE in a procedure prior to the present procedure and/or information stored in advance. Note that the procedure prior to the present procedure may be, for example, the registration procedure, and/or the UE configuration update procedure, or the network-initiated PDU session management procedure. The procedure prior to the present procedure may be a procedure performed prior to the present procedure other than the above.

The UE may transmit an SM message (e.g., a PDU session establishment request message) included in the Registration request message, or transmit the SM message (e.g., the PDU session establishment request message) with the Registration request message to initiate a PDU session establishment procedure, during the registration procedure.

In a case that the 5G AN (or the gNB) receives the RRC message including the Registration request message, the 5G AN (or the gNB) selects the AMF to which the Registration request message is to be forwarded (S802). Note that the 5G AN (or the gNB) can select the AMF, based on the information included in the Registration request message and/or the RRC message. Specifically, the 5G AN (or the gNB) may select the AMF that supports the 5GLAN service, based on at least one piece of identification information out of the 1st identification information to the 3rd identification information. Note that the method of selecting the AMF is not limited to this, and the 5G AN (or the gNB) may select the AMF, based on a condition other than the above. The 5G AN (or the gNB) extracts the Registration request message from the received RRC message, and forwards the Registration request message to the selected AMF (S804).

In a case that the AMF receives the Registration request message, the AMF can perform the first condition determination. The first condition determination is a condition determination for determining whether or not the network (or the AMF) accepts the request of the UE. In a case that the first condition determination is true, the AMF initiates the procedure of (A) of FIG. 6, whereas in a case that the first condition determination is false, the AMF initiates the procedure of (B) of FIG. 6.

Note that the first condition determination may be performed based on reception of the Registration request message, and/or each piece of identification information included in the Registration request message, and/or subscription information, and/or capability information of the network, and/or an operator policy, and/or a state of the network, and/or registration information of the user, and/or a context stored by the AMF, and/or the like. For example, in a case that the network allows the request of the UE, the first condition determination may be true, whereas in a case that the network does not allow the request of the UE, the first condition determination may be false. In a case that the network of a registration destination of the UE and/or the apparatus in the network supports the function requested by the UE, the first condition determination may be true, whereas in a case that the network of the registration destination of the UE and/or the apparatus in the network does not support the function requested by the UE, the first condition determination may be false. In addition, in a case that the transmitted and/or received identification information is allowed, the first condition determination may be true, whereas in a case that the transmitted and/or received identification information is not allowed, the first condition determination may be false. Note that conditions for determining whether the first condition determination is true or false may not be limited to the above-described conditions.

First, a case that the first condition determination is true will be described. In the procedure of (A) of FIG. 6, first, the AMF can perform the fourth condition determination. The fourth condition determination is a condition determination for determining whether or not the AMF performs transmission and/or reception of the SM message to and/or from the SMF.

Note that the fourth condition determination may be performed based on whether or not the AMF has received the SM message. The fourth condition determination may be performed based on whether or not the SM message is included in the Registration request message. For example, in a case that the AMF has received the SM message and/or the SM message is included in the Registration request message, the fourth condition determination may be true, whereas in a case that the AMF has not received the SM message and/or the SM message is not included in the Registration request message, the fourth condition determination may be false. Note that conditions for determining whether the fourth condition determination is true or false may not be limited to the above-described conditions.

In a case that the fourth condition determination is true, the AMF selects the SMF and performs transmission and/or reception of the SM message to and/or from the selected SMF, whereas in a case that the fourth condition determination is false, the AMF does not perform such operations (S806). Even in a case that the fourth condition determination is true, the AMF may cancel the procedure of (A) of FIG. 6 in a case that the AMF receives the SM message indicating rejection from the SMF. In this case, the AMF can initiate the procedure of (B) of FIG. 6.

Note that, in S806, in a case that the AMF performs transmission and/or reception of the SM message to and/or from the SMF, the AMF can notify the SMF of the identification information received in the Registration request message. The SMF can acquire the identification information received from the AMF through transmission and/or reception of the SM message to and/or from the AMF.

Next, the AMF transmits a Registration accept message to the UE via the 5G AN (or the gNB) as a response message for the Registration request message, based on reception of the Registration request message, and/or completion of transmission and/or reception of the SM message to and/or from the SMF (S808). For example, in a case that the fourth condition determination is false, the AMF may transmit the Registration accept message, based on reception of the Registration request message from the UE. In a case that the fourth condition determination is true, the AMF may transmit the Registration accept message, based on completion of transmission and/or reception of the SM message to and/or from the SMF. Note that the Registration accept message is a NAS message transmitted and/or received on the N1 interface, but is transmitted and/or received being included in the RRC message between the UE and the 5G AN (gNB).

The AMF may transmit one or more pieces of identification information out of at least the 11th identification information to the 18th identification information being included in the Registration accept message. Note that, by transmitting these pieces of identification information and/or the Registration accept message, the AMF may indicate that the network supports each function, may indicate that the request of the UE has been accepted, or may indicate information combining these. In addition, in a case that multiple pieces of identification information are transmitted and/or received, two or more pieces of identification information of these pieces of identification information may be configured as one or more pieces of identification information. Note that the information indicating support of each function and the information indicating the request for the use of each function may be transmitted and/or received as the same piece of identification information, or may be transmitted and/or received as different pieces of identification information.

The UE may recognize whether or not the network supports the 5GLAN service, based on reception of the 11th identification information. Specifically, in a case that the UE receives the 11th identification information indicating that the network supports the 5GLAN service, the UE may recognize that the network supports the 5GLAN service. In contrast, in a case that the UE receives the 11th identification information indicating that the network does not support the 5GLAN service or receives the 11th identification information, the UE may recognize that the network does not support the 5GLAN service.

The UE may recognize whether or not the use of the 5GLAN service has been allowed by the network, based on reception of the 11th identification information. Specifically, in a case that the UE receives the 11th identification information indicating that the network supports the 5GLAN service, the UE may recognize that the use of the 5GLAN service has been allowed by the network. In contrast, in a case that the UE receives the 11th identification information indicating that the network does not support the 5GLAN service or does not receive the 11th identification information, the UE may recognize that the use of the 5GLAN service is not allowed by the network.

The UE may recognize whether or not the request for the use of the 5GLAN service has been accepted by the network, based on reception of the 12th identification information. Specifically, in a case that the UE receives the 12th identification information indicating that the network accepts the request for the 5GLAN service, the UE may recognize that the network has accepted the request for the 5GLAN service. In contrast, in a case that the UE receives the 12th identification information indicating that the network does not accept the request for the 5GLAN service or does not receive the 12th identification information, the UE may recognize that the network does not accept the request for the 5GLAN service.

The UE may recognize whether or not the use of the 5GLAN service has been allowed by the network, based on reception of the 12th identification information. Specifically, in a case that the UE receives the 12th identification information indicating that the network accepts the request for the 5GLAN service, the UE may recognize that the use of the 5GLAN service has been allowed by the network. In contrast, in a case that the UE receives the 12th identification information indicating that the network does not accept the request for the 5GLAN service or does not receive the 12th identification information, the UE may recognize that the use of the 5GLAN service is not allowed by the network.

In a case that the UE receives the 13th identification information, the UE may store the received one or multiple 5GLAN group IDs, may store the received one or multiple 5GLAN group IDs as the 5GLAN group IDs allowed by the network, may store the received one or multiple 5GLAN group IDs as the information of the 5GLAN, or may store the received one or multiple 5GLAN group IDs in association with the PLMN IDs and/or area information. Note that the area information may be information indicating the registration area, or may be information indicating the 5GLAN service area.

In a case that the UE receives the 14th identification information, the UE may store the received one or multiple 5GLAN group IDs, may store the received one or multiple 5GLAN group IDs as the 5GLAN group IDs rejected by the network, may store the received one or multiple 5GLAN group IDs as the information of the 5GLAN, or may store the received one or multiple 5GLAN group IDs in association with the PLMN IDs and/or the area information. In addition, in a case that the UE receives the 14th identification information, the UE may add the received 5GLAN group ID to a set of rejected 5GLAN group IDs.

In a case that the UE receives the 15th identification information, the UE may store the received one or multiple 5GLAN group IDs, may store the received one or multiple 5GLAN group IDs as the configured 5GLAN group IDs, may store the received one or multiple 5GLAN group IDs as the information of the 5GLAN, or may store the received one or multiple 5GLAN group IDs in association with the PLMN IDs and/or the area information.

In a case that the UE receives the 16th identification information, the UE may store information indicating the received one or multiple 5GLAN service areas, or may store the information indicating the received one or multiple 5GLAN service areas in association with the 5GLAN group IDs.

Specifically, in a case that the UE receives the 16th identification information indicating the 5GLAN service area allowed by the network, the UE may store the 5GLAN group IDs indicated by the 13th identification information and the 5G LAN service areas indicated by the 16th identification information in association with each other, or may store the 5GLAN group IDs indicated by the 15th identification information and the 5GLAN service areas indicated by the 16th identification information in association with each other. In contrast, in a case that the UE receives the 16th identification information indicating the 5GLAN service area prohibited by the network, the UE may store the 5GLAN group IDs indicated by the 14th identification information and 5GLAN service areas indicated by the 16th identification information in association with each other.

In a case that the UE receives the 17th identification information, the UE may store the received information of one or multiple 5GLANs. In addition, in a case that the UE receives the 17th identification information and the UE already stores information of the 5GLAN, the UE may delete old information of a 5GLAN. In other words, the UE may update the old information of the 5GLAN to new information of a 5GLAN indicated by the received 17th identification information and store the information. Alternatively, the UE may additionally store the information of the 5GLAN indicated by the received 17th identification information to the information of the 5GLAN already stored by the UE.

In a case that the UE receives the 18th identification information, the UE may recognize a cause why the request of the UE has been rejected. Specifically, in a case that the UE receives the 18th identification information, the UE may recognize a cause why the 5GLAN group ID requested by the UE has been rejected.

In a case that the UE receives the 18th identification information, the UE determines in which set the one or multiple 5GLAN group IDs rejected by the network indicated by the 14th identification information are to be included and stored, based on a cause value indicated by the 18th identification information. Specifically, in a case that the UE receives the 18th identification information indicating that the requested 5GLAN group ID is not allowed by the UE in the current PLMN, the UE adds one or multiple 5GLAN group IDs rejected by the network indicated by the 14th identification information to the set of 5GLAN group IDs rejected in the current PLMN. Alternatively, in a case that the UE receives the 18th identification information indicating that the requested 5GLAN group ID is not allowed in the area to which the UE currently belongs, the UE adds one or multiple 5GLAN group IDs rejected by the network indicated by the 14th identification information to the set of 5GLAN group IDs rejected in a combination of the current PLMN and the current area. Note that the current area may be a registration area to which the UE currently belongs, or may be a 5GLAN service area to which the UE currently belongs.

Note that each processing described in the above performed by the UE based on reception of each piece of identification information may be performed during the present procedure or after completion of the present procedure, or may be performed based on completion of the present procedure after completion of the present procedure.

Note that the AMF may select and determine which piece of identification information out of the 11th identification information to the 18th identification information is to be included in the Registration accept message, based on each piece of received identification information, and/or subscription information, and/or capability information of the network, and/or an operator policy, and/or a state of the network, and/or registration information of the user, and/or a context stored by the AMF, and the like.

For example, in a case that each apparatus in the core network and/the core network supports the 5GLAN service, the AMF may configure information indicating that the network supports the 5GLAN service for the 11th identification information, or may transmit the 11th identification information indicating that the network supports the 5GLAN service being included in the Registration accept message. In contrast, in a case that each apparatus in the core network and/the core network does not support the 5GLAN service, the AMF may configure information indicating that the network does not support the 5GLAN service for the 11th identification information, may transmit the 11th identification information indicating that the network does not support the 5GLAN service being included in the Registration accept message, or may not transmit the 11th identification information.

In other words, the AMF may transmit the 11th identification information in order to notify the UE that each apparatus in the core network and/the core network supports the 5GLAN service, or the AMF may transmit the 11th identification information in order to notify the UE that each apparatus in the core network and/the core network does not support the 5GLAN service.

In a case that the AMF receives a request for the use of the 5GLAN service from the UE and accepts the request for the 5GLAN service, the AMF may configure information indicating that the network has accepted the request for the use of the 5GLAN service for the 12th identification information, or may transmit the 12th identification information indicating that the network has accepted the request for the use of the 5GLAN service being included in the Registration accept message. In contrast, in a case that the AMF receives a request for the use of the 5GLAN service from the UE and does not accept the request for the 5GLAN service, the AMF may configure information indicating that the network does not accept the request for the use of the 5GLAN service for the 12th identification information, may transmit the 12th identification information indicating that the network does not accept the request for the use of the 5GLAN service being included in the Registration accept message, or may not transmit the 12th identification information.

In other words, the AMF may transmit the 12th identification information in order to notify the UE that the network has accepted the request for the use of the 5GLAN service, or the AMF may transmit the 12th identification information in order to notify the UE that the network does not accept the request for the use of the 5GLAN service.

In a case that the AMF receives one or more pieces of identification information out of the 1st identification information to the 3rd identification information from the UE and there is a 5GLAN group ID allowed by the network, the AMF may transmit the 13th identification information. In contrast, in a case that the AMF receives one or more pieces of identification information out of the 1st identification information to the 3rd identification information from the UE and there is no 5GLAN group ID allowed by the network, the AMF may not transmit the 13th identification information. In other words, the AMF may transmit the 13th identification information in order to notify the UE of one or multiple 5GLAN group IDs allowed by the network.

In a case that the AMF receives the 3rd identification information from the UE, the AMF may transmit the 14th identification information and/or the 18th identification information. In contrast, in a case that the AMF does not receive the 3rd identification information from the UE, the AMF may not transmit the 14th identification information and/or the 18th identification information.

In a case that the network does not allow, or rejects, at least one 5GLAN group ID out of the 5GLAN group IDs requested by the UE, the AMF may transmit the 14th identification information and/or the 18th identification information. In contrast, in a case that the network allows all of the 5GLAN group IDs requested by the UE, the AMF may not transmit the 14th identification information and/or the 18th identification information. Note that, in a case that the AMF transmits the 14th identification information, the AMF may transmit the 18th identification information. In other words, the AMF may transmit the 14th identification information in order to give notification of the rejected 5GLAN group ID. In addition, the AMF may transmit the 18th identification information in order to notify the UE of a cause why the request of the UE is rejected.

In a case that there is a change in one or multiple 5GLAN group IDs stored by the network, and/or the network newly assigns a 5GLAN group ID to the UE, and/or the AMF receives at least one piece of the 1st identification information to the 3rd identification information from the UE, the AMF may transmit the 15th identification information. Even in a case that there is no change in one or multiple 5GLAN group IDs stored by the network, the AMF may transmit the 15th identification information. By transmitting the 15th identification information, the AMF may request the UE to maintain storage of the 5GLAN group IDs.

In other words, the AMF may transmit the 15th identification information in order to notify the UE of the 5GLAN group IDs stored by the network, and/or in order to notify the UE that there is a change in the 5GLAN group IDs stored by the network, and/or in order to notify the UE that the network has newly assigned a 5GLAN group ID to the UE, and/or in order to request the UE to maintain the 5GLAN group IDs.

In a case that the AMF receives at least one piece of the 1st identification information to the 3rd identification information from the UE and there is one or multiple 5GLAN service areas active for the UE, the AMF may transmit the 16th identification information. In other words, the AMF may transmit the 16th identification information in order to give notification of the one or multiple 5GLAN service areas active for the UE.

In a case that the AMF receives at least one piece of the 1st identification information to the 3rd identification information, there is a 5GLAN group ID allowed for the UE, and/or there is a 5GLAN service area active for the UE, the AMF may transmit the 17th identification information. In other words, the AMF may transmit the 17th identification information in order to give notification of the 5GLAN group ID allowed for the UE and/or the 5GLAN service area active for the UE.

The AMF can transmit the SM message (for example, the PDU session establishment accept message) being included in the Registration accept message, or can transmit the SM message (for example, the PDU session establishment accept message) together with the Registration accept message. Note that the transmission method may be performed in a case that the SM message (for example, the PDU session establishment request message) is included in the Registration request message and the fourth condition determination is true. The transmission method may be performed in a case that the SM message (for example, the PDU session establishment request message) is included together with the Registration request message and the fourth condition determination is true. The AMF can indicate that the procedure for the SM has been accepted in the registration procedure by performing the transmission method as described above.

The AMF may indicate that the request of the UE has been accepted by transmitting the Registration accept message, based on each piece of received identification information, and/or subscription information, and/or capability information of the network, and/or an operator policy, and/or a state of the network, and/or registration information of the user, and/or a context stored by the AMF, and the like.

The UE receives the Registration accept message via the 5G AN (gNB) (S808). By receiving the Registration accept message, the UE can recognize that the request of the UE made with the Registration request message has been accepted and the contents of various pieces of identification information included in the Registration accept message.

The UE can further transmit the registration complete message to the AMF via the 5G AN (gNB) as a response message for the Registration accept message (S810). Note that, in a case that the UE receives the SM message such as the PDU session establishment accept message, the UE may transmit the SM message such as the PDU session establishment complete message being included in the registration complete message, or may indicate that the procedure for the SM has been completed by including the SM message. Here, the registration complete message is a NAS message transmitted and/or received on the N1 interface, but is transmitted and/or received being included in the RRC message between the UE and the 5G AN (gNB).

The AMF receives the registration complete message via the 5G AN (gNB) (S810). Each apparatus completes the procedure of (A) of FIG. 6, based on transmission and/or reception of the Registration accept message and/or the registration complete message.

Next, a case that the first condition determination is false will be described. In the procedure of (B) of FIG. 6, the AMF transmits the Registration reject message to the UE via the 5G AN (gNB) as a response message for the Registration request message (S812). Here, the registration reject message is a NAS message transmitted and/or received on the N1 interface, but is transmitted and/or received being included in the RRC message between the UE and the 5G AN (gNB).

Note that, by transmitting the registration reject message, the AMF may indicate that the request of the UE made with the Registration request message has been rejected. In addition, the AMF may transmit the 21st identification information being included in the registration reject message, or may indicate a cause why the request from the UE has been rejected by transmitting the 21st identification information. In addition, the AMF may transmit a value of a back-off timer being included in the registration reject message. Note that, based on reception of at least one piece of identification information of the 1st identification information to the 3rd identification information, the AMF may transmit the 21st identification information.

In addition, by receiving the 21st identification information, the UE may recognize a cause why the request of the UE has been rejected. Specifically, based on reception of the 21st identification information, the UE may recognize that the network does not support the 5GLAN service, may recognize that the 5GLAN service is not allowed, may recognize that the 5GLAN service is not supported and/or the 5GLAN service is not allowed in the current PLMN, may recognize that the 5GLAN service is not supported and/or the 5GLAN service is not allowed in the current area, or may recognize a combination of these.

Based on reception of the registration reject message and/or the 21st identification information, the UE may delete stored information, specifically, may delete the information of the 5GLAN.

Based on reception of the registration reject message and/or the 21st identification information, the UE may start count of the back-off timer. Here, as the back-off timer started by the UE, a back-off timer value received from the network may be used, or a timer value stored by the UE may be used. While the UE performs at least count of the back-off timer, the UE may not initiate the registration procedure again, may stop the registration procedure, or may be prohibited to perform the registration procedure.

Based on reception of the registration reject message and/or the 21st identification information, the UE may transition to a state in which the 5GLAN service is restricted.

Note that each processing described in the above performed by the UE based on reception of each piece of identification information may be performed during the present procedure or after completion of the present procedure, or may be performed based on completion of the present procedure after completion of the present procedure. The UE receives the registration reject message via the 5G AN (gNB) (S812). By receiving the registration reject message, the UE can recognize that the request of the UE made with the Registration request message has been rejected and contents of various pieces of identification information included in the registration reject message. In a case that the UE does not receive the Registration accept message or the registration reject message even after the elapse of a prescribed period after transmitting the Registration request message, the UE may recognize that the request of the UE has been rejected. Based on transmission and/or reception of the registration reject message, each apparatus completes the procedure of (B) in the present procedure.

Figure 6:
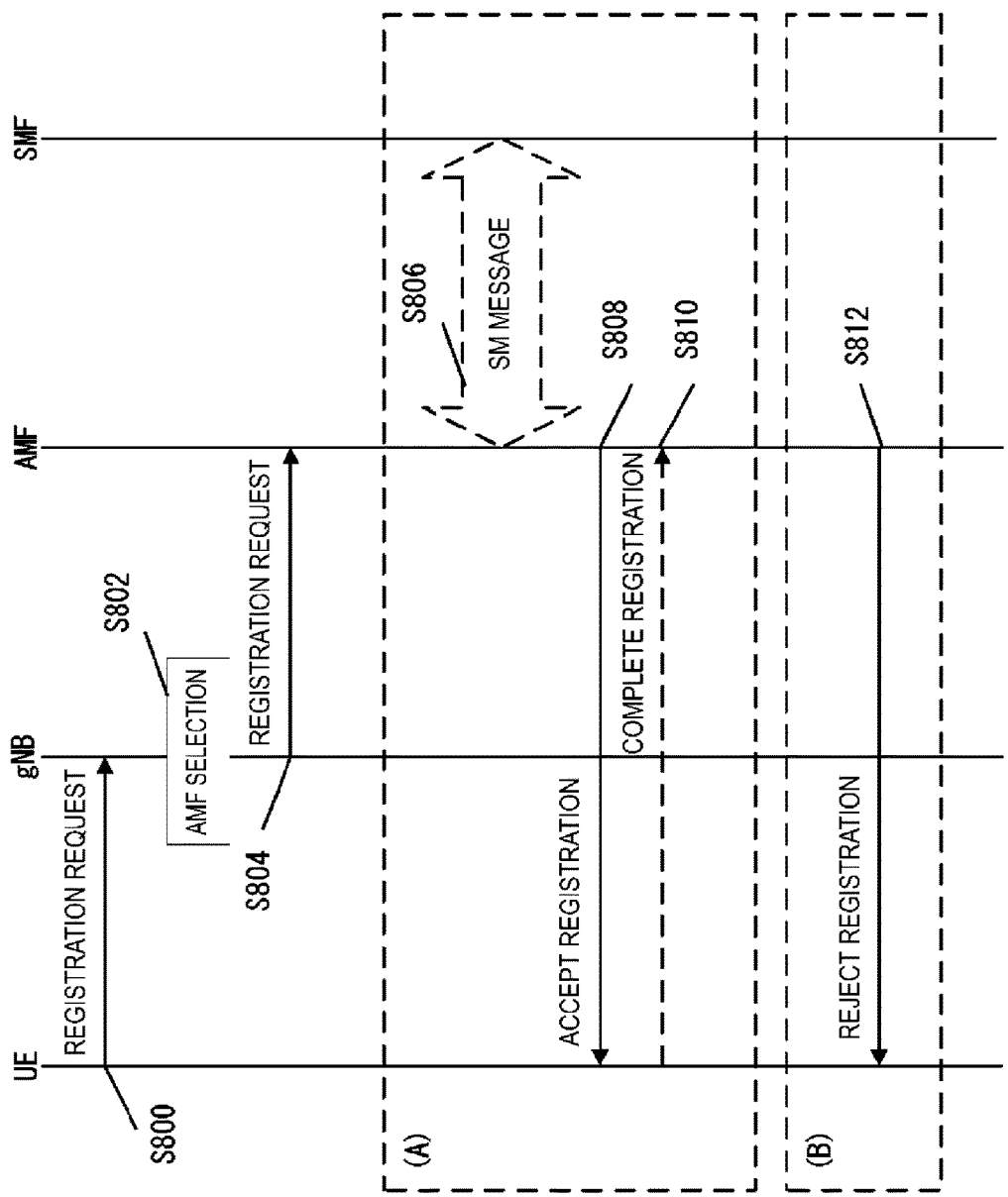
FIG. 6 is a diagram illustrating a registration procedure.

Note that the procedure of (B) of FIG. 6 may be initiated in a case that the procedure of (A) of FIG. 6 is canceled. In the procedure of (A) of FIG. 6, in a case that the fourth condition determination is true, the AMF may transmit the SM message indicating rejection such as the PDU session establishment reject message being included in the registration reject message, or may indicate that the procedure for the SM has been rejected by including the SM message indicating rejection. In such a case, the UE may further receive the SM message indicating rejection such as the PDU session establishment reject message, or may recognize that the procedure for the SM has been rejected.

Based on completion of the procedure of (A) or (B) of FIG. 6, each apparatus completes the registration procedure. Note that, based on completion of the procedure of (A) of FIG. 6, each apparatus may transition to a state (RM_REGISTERED state) in which the UE is registered with the network, or based on completion of the procedure of (B) of FIG. 6, each apparatus may maintain a state (RM_DEREGISTERED state) in which the UE is not registered with the network or may transition to a state in which the UE is not registered with the network. The transition of each apparatus to each state may be performed based on completion of the registration procedure, or may be performed based on establishment of the PDU session.

In addition, based on completion of the registration procedure, each apparatus may perform processing that is based on the information transmitted and/or received in the registration procedure. For example, in a case that each apparatus transmits and/or receives information indicating that a part of the request of the UE has been rejected, each apparatus may recognize a cause why the request of the UE has been rejected. In addition, based on the cause why the request of the UE has been rejected, each apparatus may perform the present procedure again, or may perform the registration procedure for the core network_A or another cell.

In addition, based on completion of the registration procedure, the UE may store the identification information received together with the Registration accept message and/or the registration reject message, or may recognize determination of the network.

For example, in a case that the UE receives the 11th identification information and/or the 13th identification information indicating that the network supports the 5GLAN service, the UE may initiate the procedure for establishing the PDU session for the 5GLAN after completion of the present procedure. In a similar manner, in a case that the UE receives the 12th identification information and/or the 13th identification information indicating that the network accepts the request for the 5GLAN service, the UE may initiate the procedure for establishing the PDU session for the 5GLAN after completion of the present procedure. In addition, based on reception of the 13th identification information, the UE may initiate the procedure for establishing the PDU session for the 5GLAN after completion of the present procedure.

In contrast, in a case that the UE recognizes that the use of the 5GLAN service is allowed by the network based on transmission and/or reception of the 11th identification information and/or the 12th identification information and further the 13th identification information is not transmitted and/or received, the UE may start a timer and wait for reception of one or multiple 5GLAN group IDs from the network until the timer is stopped or the timer expires. In addition, in a case that the UE receives one or multiple 5GLAN group IDs from the network before the timer started by the UE expires, the UE may stop the timer, and in a case that the timer expires, the UE may initiate the registration procedure and/or the PDU session establishment procedure for the 5GLAN.

In a case that the UE has already established the PDU session for the 5GLAN by using the 5GLAN group ID not included in one or multiple 5GLAN group IDs indicated by the 13th identification information, the UE initiates the release procedure of the PDU session corresponding to the 5GLAN group ID not included in the one or multiple 5GLAN group IDs indicated by the 13th identification information after completion of the present procedure, based on reception of the 13th identification information. Note that the release procedure of the PDU session may be a UE-requested PDU session release procedure that is initiated in a case that the UE transmits a PDU session release request message to the SMF, or may be a network-requested PDU session release procedure that is initiated in a case that the SMF transmits a PDU session release command message to the UE. In addition, the release procedure of the PDU session may be a procedure in which the UE locally releases the PDU session.

Based on reception of the 16th identification information, the UE may initiate the PDU session establishment procedure for establishing the PDU session for the 5GLAN while the UE is located inside of the 5GLAN service area indicated by the received information after completion of the present procedure. In contrast, based on reception of the 16th identification information, in a case that the UE is located outside of the 5GLAN service area indicated by the received information, the UE need not initiate or may stop the PDU session establishment procedure for establishing the PDU session for the 5GLAN. In addition, based on reception of the 16th identification information, in a case that the UE is located outside of the 5GLAN service area indicated by the received information, the UE may be prohibited to perform the PDU session establishment procedure for establishing the PDU session for the 5GLAN.

In addition, in a case that the UE moves to the outside of the 5GLAN service area from the inside of the 5GLAN service area after the UE receives the 16th identification information, the UE releases the PDU session for the 5GLAN corresponding to the 5GLAN service area indicated by the 16th identification information and/or corresponding to the 5GLAN group ID associated with the 5GLAN service area indicated by the 16th identification information, or releases a user plane resource associated with a corresponding PDU session for the 5GLAN.

In addition, in a case that the UE returns to the inside of the 5GLAN service area from the outside of the 5GLAN service area after the UE releases the user plane resource associated with the PDU session for the 5GLAN, the UE may initiate a reestablishment procedure of the user plane resource associated with the released PDU session for the 5GLAN. In contrast, in a case that the UE does not return to the inside of the 5GLAN service area from the outside of the 5GLAN service area even after a certain period after the UE releases the user plane resource associated with the PDU session for the 5GLAN, the UE may release the PDU session for the 5GLAN from which the user plane resource is released.

Based on reception of the 17th identification information, the UE may initiate the PDU session establishment procedure for establishing the PDU session for the 5GLAN by using the information of the 5GLAN indicated by the 17th identification information after completion of the present procedure. Specifically, while the UE is located inside of the 5GLAN service area after the UE receives the 17th identification information and the present procedure completes, the UE may initiate the PDU session establishment procedure for establishing the PDU session for the 5GLAN by using a corresponding 5GLAN group ID.

In contrast, while the UE is located outside of the 5GLAN service area after the UE receives the 17th identification information and the present procedure completes, the UE need not initiate or may stop the PDU session establishment procedure for establishing the PDU session for the 5GLAN using a corresponding 5GLAN group ID. In addition, in a case that the UE is located outside of the 5GLAN service area after the UE receives the 17th identification information and the present procedure completes, the UE may be prohibited to perform the PDU session establishment procedure for establishing the PDU session for the 5GLAN using a corresponding 5GLAN group ID.

In addition, in a case that the UE moves to the outside of the 5GLAN service area from the inside of the 5GLAN service area after the UE receives the 17th identification information, the UE releases the PDU session for the 5GLAN that corresponds to the 5GLAN service area indicated by the 17th identification information and/or that is indicated by the 17th identification information, or releases a user plane resource associated with a corresponding PDU session for the 5GLAN.

In addition, in a case that the UE returns to the inside of the 5GLAN service area from the outside of the 5GLAN service area after the UE releases the user plane resource associated with the PDU session for the 5GLAN, the UE may initiate the reestablishment procedure of the user plane resource associated with the released PDU session for the 5GLAN. In contrast, in a case that the UE does not return to the inside of the 5GLAN service area from the outside of the 5GLAN service area even after a certain period after the UE releases the user plane resource associated with the PDU session for the 5GLAN, the UE may release the PDU session for the 5GLAN from which the user plane resource is released.

In a case that the UE has already established the PDU session for the 5GLAN by using the information of the 5GLAN different from the information of the 5GLAN indicated by the 17th identification information, based on reception of the 17th identification information, the UE initiates the release procedure of the PDU session not corresponding to the information of the 5GLAN indicated by the 17th identification information after completion of the present procedure. Note that the release procedure of the PDU session may be a UE-requested PDU session release procedure that is initiated in a case that the UE transmits a PDU session release request message to the SMF, or may be a network-requested PDU session release procedure that is initiated in a case that the SMF transmits a PDU session release command message to the UE. In addition, the release procedure of the PDU session may be a procedure in which the UE locally releases the PDU session. Note that the UE may initiate the release procedure of the PDU session for the 5GLAN after completion of the present procedure.

Based on reception of the 21st identification information, the UE may initiate the registration procedure on another condition after completion of the present procedure. Note that, in a case that the UE runs the back-off timer, the UE may initiate the registration procedure on another condition after the count of the back-off timer expires.

Here, the case that the UE initiates the registration procedure on another condition indicates that, for example, the UE may initiate the registration procedure by configuring the 5GLAN group ID different from the previously transmitted 5GLAN group ID for the 3rd identification information and transmitting the 3rd identification information to the network, the UE may initiate the registration procedure by changing its located area and then transmitting the Registration request message, or the UE may initiate the registration procedure by reflecting a change combining these. Alternatively, the case that the UE initiates the registration procedure on another condition indicates that the UE may initiate the registration procedure without using the information related to the 5GLAN service. Specifically, by transmitting the 1st identification information to the 3rd identification information without being included in the Registration request message, the UE may initiate the registration request procedure without the request for the 5GLAN service.

3.2.2. PDU Session Establishment Procedure

Next, an overview of the PDU session establishment procedure performed for establishing the PDU session for the DN will be described with reference to FIG. 7. The PDU session establishment procedure is a procedure in 5GS. In the following, the present procedure refers to the PDU session establishment procedure. The PDU session establishment procedure is a procedure for each apparatus to establish the PDU session. Note that each apparatus can initiate the PDU session establishment procedure at any timing after the registration procedure has completed and the state has become the registered state. Each apparatus may be able to perform the PDU session establishment procedure during the registration procedure. Each apparatus may establish the PDU session, based on completion of the PDU session establishment procedure. Note that the PDU session establishment procedure may be a procedure initiated by the UE, or may be a procedure initiated by a request of the UE. Each apparatus can establish multiple PDU sessions by performing the PDU session establishment procedure multiple times. For example, in a case that the UE requests to belong to multiple 5GLAN groups, the UE may initiate the establishment procedure of the PDU session for each 5GLAN group that the UE requests.

In addition, the UE may initiate the PDU session establishment procedure, based on identification information received in the registration procedure. For example, in a case that the UE supports the 5GLAN service, the UE may initiate the PDU session establishment procedure by using the information of the 5GLAN received in the registration procedure in order to establish the PDU session for the 5GLAN.

First, the UE transmits a NAS message including the PDU session establishment request message to the SMF via the 5G AN (gNB) and the AMF (S900) (S902) (S904), and thereby initiates the PDU session establishment procedure.

Specifically, the UE transmits the NAS message including the PDU session establishment request message to the AMF via the N1 interface through the 5G AN (gNB) (S900).

Here, the UE can transmit one or more pieces of identification information out of at least the 31st identification information to the 32nd identification information being included in the PDU session establishment request message and/or the NAS message, but can transmit the one or more pieces of identification information being included in a control message different from these, for example, a control message of a layer (for example, the MAC layer, the RLC layer, or the PDCP layer) that is lower than the RRC layer. These pieces of identification information may indicate the request of the UE by being included in these messages. Two or more pieces of identification information of these pieces of identification information may be configured as one or more pieces of identification information.

By transmitting the 31st identification information, the UE may request the network to establish the PDU session for the 5GLAN, or may request that the UE belong to the 5GLAN group indicated by the 31st identification information. Note that, in a case that the UE stores one or multiple 5GLAN group IDs allowed by the network, the UE may select one 5GLAN group ID out of one or multiple 5GLAN group IDs stored by the UE and configure the one 5GLAN group ID for the 31st identification information before initiation of the present procedure or during the present procedure. Note that, in a case that the UE stores at least one of the information of the 5GLAN and/or the 5GLAN group ID allowed by the network, the UE may transmit the 31st identification information. In contrast, in a case that the UE does not store the information of the 5GLAN and/or the 5GLAN group ID allowed by the network, the UE may not include the 31st identification information in the PDU session establishment request message, or may not transmit the 31st identification information to the SMF. In this case, establishment of the PDU session for the 5GLAN may be prohibited, or the UE may be prohibited to initiate the PDU session establishment procedure for PDU session establishment for the 5GLAN.

By transmitting the 32nd identification information, the UE may indicate the PDU session type of which establishment is requested for the network. For example, in a case that the UE requests establishment of the PDU session for the 5GLAN, the UE may configure information indicating Ethernet for the 32nd identification information. Note that, in a case that the UE requests establishment of the PDU session for the 5GLAN, the UE may configure information indicating IPv4, or IPv6, or IPv4v6, or Unstructured for the 32nd identification information.

In a case that the AMF receives the NAS message including the PDU session establishment request message (S900), the AMF extracts the PDU session establishment request message from the NAS message, and selects the SMF as a forwarding destination of the PDU session establishment request message (S902). Note that the AMF may select the SMF as the forwarding destination, based on each piece of identification information included in the PDU session establishment request message and/or the NAS message, and/or subscription information, and/or capability information of the network, and/or an operator policy, and/or a state of the network, and/or registration information of the user, and/or a context stored by the AMF, and the like.

For example, the AMF may select the SMF that supports the 5GLAN service, based on the received 31st identification information, may select the SMF that manages the 5GLAN group indicated by the 5GLAN group ID indicated by the 31st identification information, may select the SMF that supports the 5GLAN group indicated by the 5GLAN group ID indicated by the 31st identification information, or may select the SMF that manages the session of the 5GLAN group indicated by the 5GLAN group ID indicated by the 31st identification information. Note that the method of selecting the SMF is not limited to this, and the AMF may select the SMF, based on a condition other than the above.

The AMF forwards the PDU session establishment request message to the selected SMF via the N11 interface (S904).

In a case that the SMF receives the PDU session establishment request message (S904), the SMF recognizes various pieces of identification information included in the PDU session establishment request message. Then, the SMF performs the third condition determination. The third condition determination is a condition determination for determining whether or not the SMF accepts the request of the UE. In the third condition determination, the SMF determines whether the third condition determination is true or false. In a case that the third condition determination is true, the SMF initiates the procedure of (A) of FIG. 7, and in a case that the third condition determination is false, the SMF initiates the procedure of (B) of FIG. 7.

Note that the third condition determination may be performed based on the PDU session establishment request message, and/or each piece of identification information included in the PDU session establishment request message, and/or subscription information, and/or capability information of the network, and/or an operator policy, and/or a state of the network, and/or registration information of the user, and/or a context stored by the SMF, and the like. For example, in a case that the network allows the request of the UE, the third condition determination may be true. In a case that the network does not allow the request of the UE, the third condition determination may be false. In addition, in a case that the network as a connection destination of the UE and/or the apparatus in the network supports the function requested by the UE, the third condition determination may be true, whereas in a case that the network as the connection destination of the UE and/or the apparatus in the network does not support the function requested by the UE, the third condition determination may be false. In addition, in a case that the transmitted and/or received identification information is allowed, the third condition determination may be true, whereas in a case that the transmitted and/or received identification information is not allowed, the third condition determination may be false. Note that conditions for determining whether the third condition determination is true or false may not be limited to the above-described conditions.

Next, steps of a case that the third condition determination is true, that is, steps of the procedure of (A) of FIG. 7, will be described. The SMF selects the UPF as an establishment destination of the PDU session, transmits the session establishment request message to the selected UPF via the N4 interface (S906), and thereby initiates the procedure of (A) of FIG. 7.

Here, the SMF may select one or more UPFs, based on each piece of identification information acquired based on reception of the PDU session establishment request message, and/or subscription information, and/or capability information of the network, and/or an operator policy, and/or a state of the network, and/or registration information of the user, and/or a context stored by the SMF, and the like. Note that, in a case that multiple UPFs are selected, the SMF may transmit the session establishment request message to each of the UPFs.

For example, based on the received 31st identification information, the SMF may select the UPF that supports the 5GLAN service, may select the UPF that supports the function of a router or a HUB in the 5GLAN service, or may select the UPF that supports the 5GLAN group indicated by the 5GLAN group ID indicated by the 31st identification information. Note that the method of selecting the UPF is not limited to this, and the SMF may select the UPF, based on a condition other than the above.

The UPF receives the session establishment request message from the SMF via the N4 interface (S906), and creates a context for the PDU session. In addition, based on reception of the session establishment request message and/or creation of the context of the PDU session, the UPF transmits the session establishment response message to the SMF via the N4 interface (S908).

The SMF receives the session establishment response message from the UPF via the N4 interface as a response message for the session establishment request message (S908). Based on reception of the PDU session establishment request message, and/or selection of the UPF, and/or reception of the session establishment response message, the SMF may perform address assignment of an address to be assigned to the UE.

Based on reception of the PDU session establishment request message, and/or selection of the UPF, and/or reception of the session establishment response message, and/or completion of the address assignment of the address to be assigned to the UE, the SMF transmits the PDU session establishment accept message to the UE via the AMF (S910) (S912).

Specifically, in a case that the SMF transmits the PDU session establishment accept message to the AMF via the N11 interface (S910), the AMF that has received the PDU session establishment request message transmits the NAS message including the PDU session establishment accept message to the UE via the N1 interface (S912). Note that the PDU session establishment accept message is a NAS message, and may be a response message for the PDU session establishment request. The PDU session establishment accept message can indicate that establishment of the PDU session has been accepted.

Here, by transmitting the PDU session establishment accept message, the SMF and the AMF may indicate that the request of the UE made with the PDU session establishment request has been accepted.

The SMF and the AMF may transmit one or more pieces of identification information out of at least the 41st identification information to the 42nd identification information being included in the PDU session establishment accept message. Note that, by transmitting these pieces of identification information and/or the PDU session establishment accept message, the SMF and the AMF may indicate that the network supports each function, or may indicate that the request of the UE has been accepted. Further, two or more pieces of identification information of these pieces of identification information may be configured as one or more pieces of identification information. Note that the information indicating support of each function and the information indicating the request for the use of each function may be transmitted and/or received as the same piece of identification information, or may be transmitted and/or received as different pieces of identification information.

Based on reception of the 41st identification information, the UE may recognize that establishment of the PDU session for the 5GLAN has been accepted, or may recognize that the PDU session for the 5GLAN has been established. In addition, based on reception of the 41st identification information, the UE may recognize the 5GLAN group ID associated with the PDU session for the 5GLAN, may recognize that communication of user data using the 5GLAN service has been enabled through the use of the established PDU session for the 5GLAN, or may recognize a combination of these.

In addition, in a case that the 41st identification information includes information indicating that the UE is to be added to the 5GLAN group, the UE may recognize that the UE has been added to the 5GLAN group, based on reception of the 41st identification information.

Based on reception of the 42nd identification information, the UE recognizes the PDU session type associated with the PDU session accepted by the network. Specifically, based on reception of the 42nd identification information, the UE may recognize that the PDU session of the same PDU session type as the PDU session type requested by the UE has been established, or may recognize that the PDU session of the PDU session type different from the PDU session type requested by the UE has been established.

Note that the SMF and the AMF may select and determine which piece of identification information out of at least the 41st identification information to the 42nd identification information is to be included in the PDU session establishment accept message, based on each piece of received identification information, and/or subscription information, and/or capability information of the network, and/or an operator policy, and/or a state of the network, and/or registration information of the user, and/or a context stored by the AMF, and the like.

For example, in a case that the UE transmits the 31st identification information to the network, and/or the network accepts establishment of the PDU session for the 5GLAN, and/or the network accepts that the UE belongs to the 5GLAN group requested by the UE, the SMF may transmit the 41st identification information.

In other words, the SMF may transmit the 41st identification information in order to give notification that the network accepts establishment of the PDU session for the 5GLAN, and/or the network accepts that the UE belongs to the 5GLAN group requested by the UE.

The SMF and the AMF can include the selected and/or allowed PDU session ID in the PDU session establishment accept message. The SMF and the AMF can specify the PDU session type indicating a type of the selected and/or allowed PDU session. As the PDU session type, as described above, any one of IPv4, IPv6, IP, Ethernet, and Unstructured can be specified. The SMF and the AMF can include an SSC mode of the selected and/or allowed PDU session in the PDU session establishment accept message.

In addition, the SMF and the AMF can include an approved QoS rule group in the PDU session establishment accept message. Note that, in the approved QoS rule group, one or multiple QoS rules may be included. In addition, in a case that multiple QoS flows and/or user plane radio bearers are established in the present procedure, multiple QoS rules may be included in the approved QoS rule group. In contrast, in the present procedure, in a case that only one QoS flow and/or user plane radio bearer is established, one QoS rule may be included in the approved QoS rule group.

In addition, the SMF may transmit information indicating that a part of the request of the UE has been rejected being included in the PDU session establishment accept message, or may indicate a cause why the part of the request of the UE has been rejected by transmitting the information indicating that the part of the request of the UE has been rejected. In addition, by receiving the information indicating that the part of the request of the UE has been rejected, the UE may recognize the cause why the part of the request of the UE has been rejected. Note that the cause for the rejection may be information indicating that contents indicated by the identification information received by the SMF are not allowed.

In a case that the UE receives the NAS message including the PDU session establishment accept message from the AMF via the N1 interface (S912), the UE transmits the PDU session establishment complete message to the SMF via the AMF (S914) (S916). By receiving the PDU session establishment accept message, the UE can detect that the request of the UE made with the PDU session establishment request has been accepted.

Specifically, the UE transmits the PDU session establishment complete message to the AMF via the N1 interface (S914). In a case that the AMF receives the PDU session establishment complete message from the UE, the AMF transmits the PDU session establishment complete message to the SMF via the N11 interface (S916).

Note that the PDU session establishment complete message transmitted from the AMF to the SMF may be a response message for the PDU session establishment accept message that is transmitted from the SMF to the AMF in S910. The PDU session establishment complete message may be a NAS message. The PDU session establishment complete message may be a message indicating that the PDU session establishment procedure is to complete.

In a case that the SMF receives the PDU session establishment complete message from the AMF via the N11 interface (S916), the SMF can perform the second condition determination. The second condition determination is a condition determination for determining a type of a transmitted and/or received message on the N4 interface. In a case that the second condition determination is true and the SMF transmits the session modification request message to the UPF via the N4 interface (S918), the SMF receives the session modification accept message transmitted from the UPF as a response message for the session modification request message (S920). In a case that the second condition determination is false and the SMF transmits the session establishment request message to the UPF via the N4 interface (S918), the SMF receives the session modification accept message transmitted from the UPF as a response message for the session establishment request message (S920).

Note that the second condition determination may be performed based on whether or not the session on the N4 interface for the PDU session has been established. For example, in a case that the session on the N4 interface for the PDU session has been established, the second condition determination may be true, whereas in a case that the session on the N4 interface for the PDU session has not been established, the second condition determination may be false. Conditions for determining true or false of the second condition determination need not be limited to the above-described conditions.

Each apparatus completes the procedure of (A) in the PDU session establishment procedure, based on transmission and/or reception of the PDU session establishment accept message, and/or transmission and/or reception of the PDU session establishment complete message, and/or transmission and/or reception of the session modification response message, and/or transmission and/or reception of the session establishment response message. In a case that the procedure of (A) in the present procedure has completed, the UE is in a state in which the PDU session for the DN has been established.

Next, steps of the procedure of (B) in the PDU session establishment procedure will be described. The SMF transmits the PDU session establishment reject message to the UE via the AMF (S922) (S924). Specifically, the SMF transmits the PDU session establishment reject message to the AMF via the N11 interface (S922). In a case that the AMF receives the PDU session establishment request message from the SMF via the N11 interface (S922), the AMF transmits the PDU session establishment reject message to the UE by using the N1 interface (S924).

Note that the PDU session establishment reject message may be a NAS message. The PDU session establishment reject message may be a message indicating that establishment of the PDU session has been rejected.

Here, by transmitting the PDU session establishment reject message, the SMF may indicate that the request of the UE made with the PDU session establishment request has been rejected. In addition, the SMF may transmit the 51st identification information being included in the PDU session establishment reject message, or may indicate a cause why the request from the UE has been rejected by transmitting the 51st identification information. In addition, the SMF may transmit a value of the back-off timer being included in the PDU session establishment reject message. Note that, based on reception of at least one piece out of the 31st identification information to the 32nd identification information, the SMF may transmit the 51st identification information.

In addition, by receiving the 51st identification information, the UE may recognize a cause why the request of the UE has been rejected. Specifically, based on reception of the 51st identification information, the UE may recognize that the 5GLAN group ID requested by the UE is not allowed, may recognize that the 5GLAN group ID requested by the UE is not allowed in the current PLMN, or may recognize that the 5GLAN group ID is not allowed in the current area.

Based on reception of the PDU session establishment reject message and/or the 51st identification information, the UE may start count of the back-off timer. Here, as the back-off timer started by the UE, a back-off timer value received from the network may be used, or a timer value stored by the UE may be used. While the UE performs at least count of the back-off timer, the UE may not initiate the PDU session establishment procedure again, may stop the PDU session establishment procedure, or may be prohibited to perform the PDU session establishment procedure.

Based on reception of the PDU session establishment reject message and/or the 51st identification information, the UE may delete stored information, specifically, may delete the information of the 5GLAN corresponding to the 5GLAN group ID requested by the UE, or may delete the 5GLAN group ID requested by the UE from one or multiple 5GLAN group IDs allowed by the network that are stored by the UE.

Based on reception of the PDU session establishment reject message and/or the 51st identification information, the UE may add the 5GLAN group ID requested by the UE to a set of rejected 5G LAN group IDs. Specifically, in a case that the 51st identification information indicates that the 5GLAN group ID requested by the UE is not allowed in the current PLMN, the UE may add the 5GLAN group ID included in the 41st identification information to the set of 5GLAN group IDs rejected in the current PLMN. In addition, in a case that the 51st identification information indicates that the 5GLAN group ID requested by the UE is not allowed in the current area, the UE may add the 5GLAN group ID included in the 41st identification information to the set of 5GLAN group IDs rejected in a combination of the current PLMN and the current area.

By receiving the PDU session establishment reject message, the UE can recognize that the request of the UE made with the PDU session establishment request has been rejected and contents of various pieces of identification information included in the PDU session establishment reject message.

Figure 7:
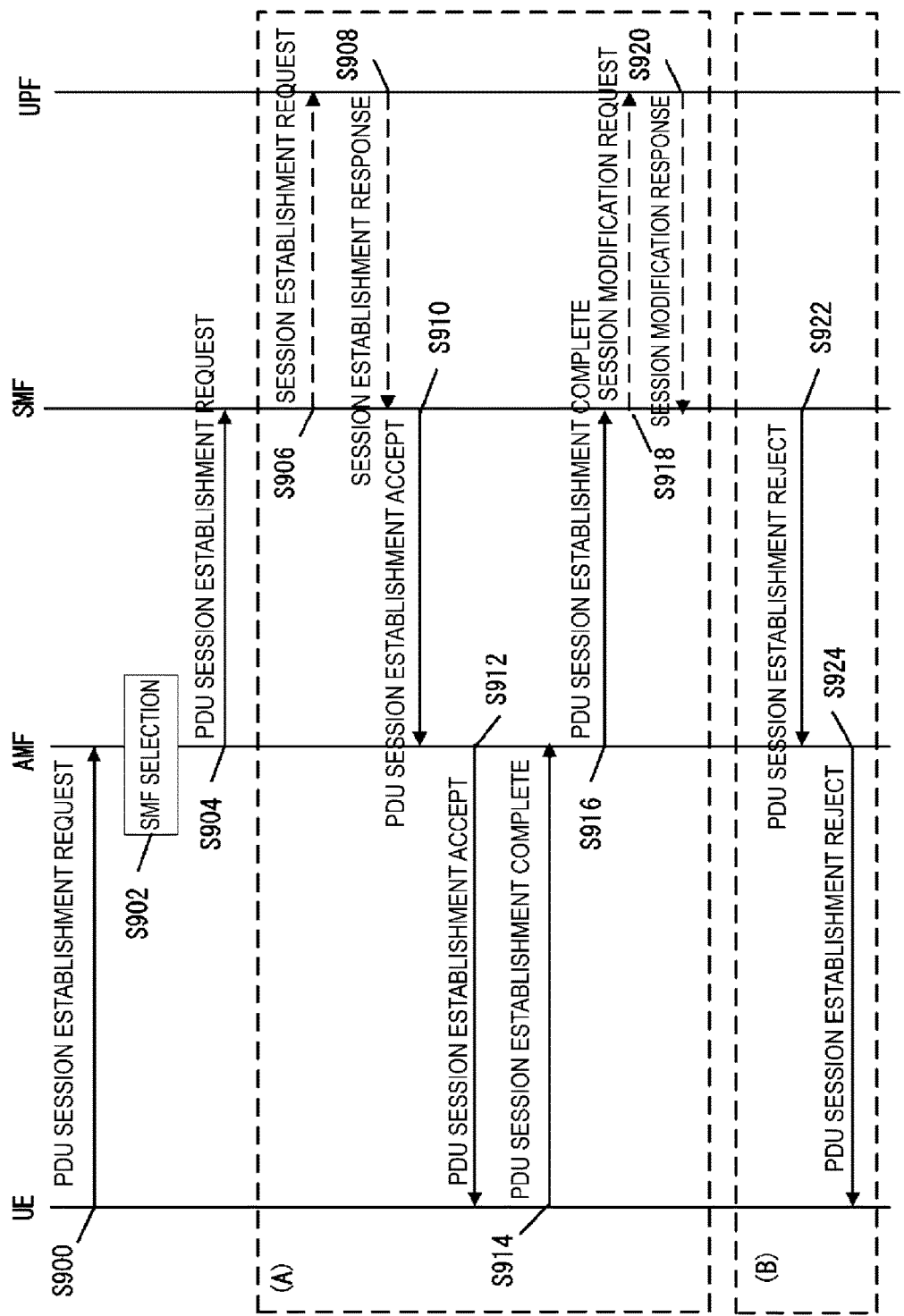
FIG. 7 is a diagram illustrating a PDU session establishment procedure.

Based on completion of the procedure of (A) or (B) of FIG. 7, each apparatus completes the PDU session establishment procedure. Note that, based on completion of the procedure of (A) of FIG. 7, each apparatus may transition to a state in which the PDU session has been established, or based on completion of the procedure of (B) of FIG. 7, each apparatus may recognize that the PDU session establishment procedure has been rejected, or may transition to a state in which the PDU session has not been established. In addition, in a case that the procedure of (A) of FIG. 7 completes, the UE can communicate with the DN by using the established PDU session.

In addition, based on completion of the PDU session establishment procedure, each apparatus may perform processing that is based on the information transmitted and/or received in the PDU session establishment procedure. For example, in a case that each apparatus transmits and/or receives information indicating that a part of the request of the UE has been rejected, each apparatus may recognize a cause why the request of the UE has been rejected. In addition, based on the cause why the request of the UE has been rejected, each apparatus may perform the present procedure again, or may perform the PDU session establishment procedure for another cell.

In addition, based on completion of the PDU session establishment procedure, the UE may store the identification information received together with the PDU session establishment accept message and/or the PDU session establishment reject message, or may recognize determination of the network.

For example, in a case that the UE receives the 41st identification information, the UE may perform user data communication using the 5GLAN service by using the established PDU session for the 5GLAN, based on completion of the present procedure and/or reception of the 41st identification information after completion of the present procedure.

In a case that the UE receives the 42nd identification information, the UE may perform user data communication of the received PDU session type, or may initiate the PDU session establishment procedure for establishing the PDU session of a type different from the received PDU session type, based on completion of the present procedure and/or reception of the 42nd identification information after completion of the present procedure.

In a case that the UE receives the 51st identification information, the UE may initiate the PDU session establishment procedure on another condition, based on completion of the present procedure and/or reception of the 51st identification information after completion of the present procedure. Note that, in a case that the UE runs the back-off timer, the UE may initiate the PDU session establishment procedure on another condition after the count of the back-off timer expires.

Here, the case that the UE initiates the PDU session establishment procedure on another condition indicates that, for example, the UE may initiate the PDU session establishment procedure by configuring the 5GLAN group ID different from the previously transmitted 5GLAN group ID for the 31st identification information and transmitting the 31st identification information to the network, the UE may initiate the PDU session establishment procedure by changing its located area and then transmitting the PDU session establishment request message, or the UE may initiate the PDU session establishment procedure by reflecting a change combining these. Note that the UE may configure the 5GLAN group ID reselected from one or multiple 5GLAN group IDs allowed by the network that are stored by the UE for new 31st identification information.

Alternatively, the case that the UE initiates the PDU session establishment procedure on another condition indicates that the UE may initiate the PDU session establishment procedure without using the information related to the 5GLAN service. Specifically, by transmitting the 31st identification information without being included in the Registration request message, the UE may request the PDU session for other than the 5GLAN.

In a case that the UE receives the 51st identification information, the UE may transition to a state in which the PDU session establishment procedure using the 5GLAN group ID requested by the UE is not initiated, a state in which the PDU session establishment procedure is stopped, or a state in which the PDU session establishment procedure is prohibited after completion of the present procedure. Here, the PDU session establishment procedure using the 5GLAN group ID requested by the UE may be the PDU session establishment procedure initiated by transmitting, by the UE, the PDU session establishment request message including the previously requested 5GLAN group ID. In other words, in a case that the UE receives the 51st identification information, the UE may be prohibited to perform the PDU session establishment procedure using the same 5GLAN group ID, or may be prohibited to transmit the PDU session establishment request message including the same 5GLAN group ID.

In a case that the UE receives the 51st identification information, the UE may be prohibited to transmit the PDU session establishment request message including the same 5GLAN group ID during a time period after completion of the present procedure until a state change of the UE occurs. Here, the state change of the UE may be turning off of the UE, or may be removal of a USIM. In addition, the state change of the UE may be update of information stored by the UE. The update of the information stored by the UE may be performed through the registration procedure, or may be performed through a UE configuration modification procedure.

In a case that the UE receives the 51st identification information, after completion of the present procedure, the UE may transition to a state in which transmission of the PDU session establishment request message including the same group ID is prohibited for a certain period, may transition to a state in which transmission of the PDU session establishment request message including the same group ID is prohibited in the same PLMN, or may transition to a state in which transmission of the PDU session establishment request message including the same group ID is prohibited in the same area. Here, the certain period may be a period configured by the back-off timer value, or may be a period configured by another network or the UE.

3.2.3. UE Configuration Update Procedure

Figure 8:
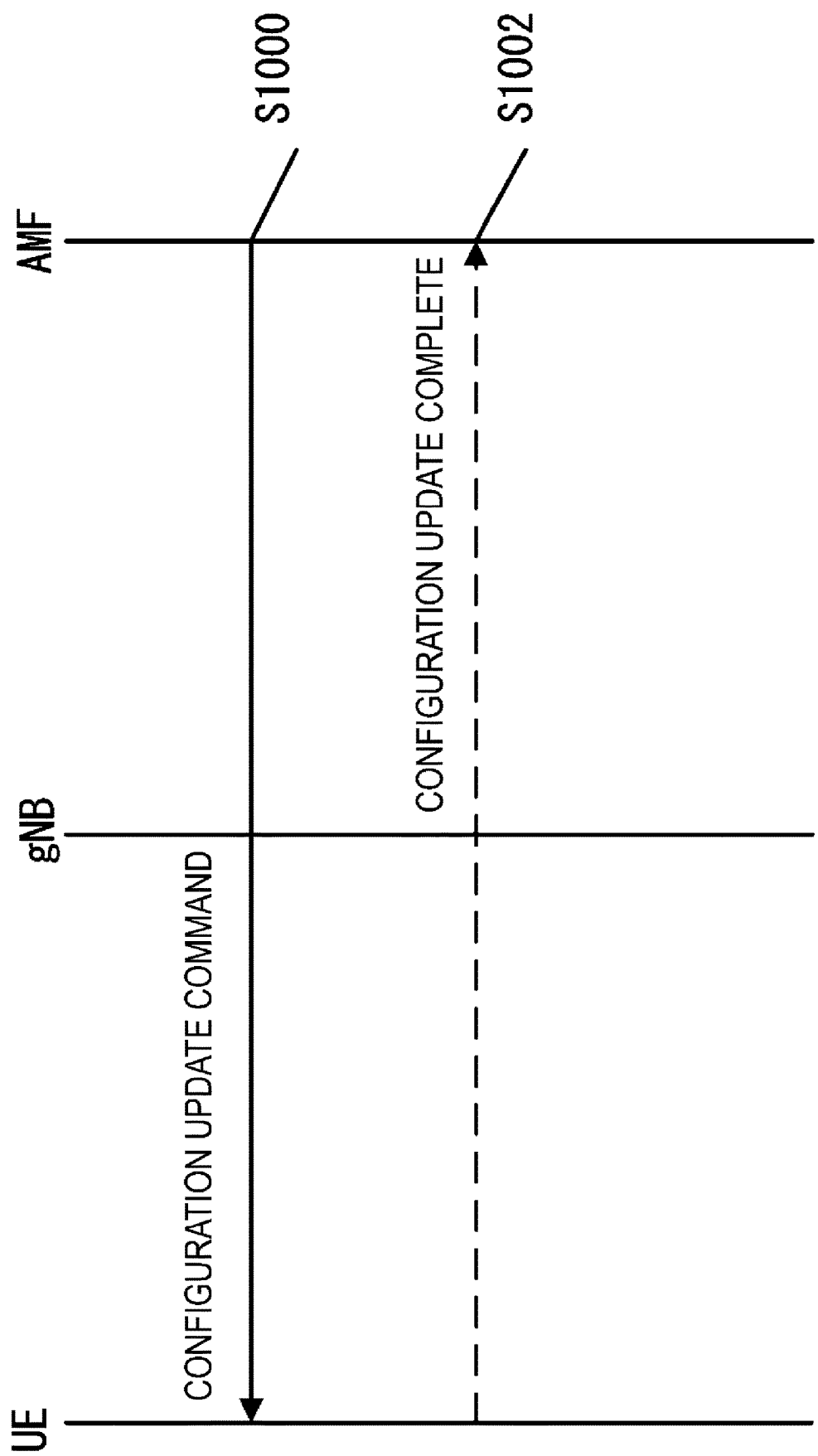
FIG. 8 is a diagram illustrating a UE configuration update procedure.

Next, the UE configuration update procedure (Generic UE configuration update procedure) will be described with reference to FIG. 8. In the following, the UE configuration update procedure is also referred to as the present procedure. The present procedure is a procedure for the core network to update configuration information of the UE. The present procedure may be a procedure for mobility management initiated and performed by the network for the UE that has been registered with the network.

In addition, the apparatus in the core network such as the AMF may initiate the present procedure, based on update of configuration of the network and/or update of an operator policy. Note that the trigger of the present procedure may be detection of mobility of the UE, may be detection of a state change of the UE, and/or the access network, and/or the core network, or may be a state change of the network slice. In addition, the trigger of the present procedure may be reception of a request from the DN and/or an application server of the DN, may be a change of configuration of the network, or a change of the operator policy. In addition, the trigger of the present procedure may be expiration of a running timer. Note that the trigger for the apparatus in the core network to initiate the present procedure is not limited to these. In other words, the present procedure may be performed at any timing after completion of the registration procedure and/or the PDU session establishment procedure described above. In addition, the present procedure may be performed at any timing on the condition that each apparatus has established the 5GMM context and/or each apparatus is in the 5GMM connected mode.

In addition, the trigger of the present procedure may be a state change of the 5GLAN service managed by the network, specifically, may be a case that the network has created a new 5GLAN group, may be a case that the network has deleted the 5GLAN group, or may be a case that the network has determined a change of members belonging to the managing 5GLAN group. In addition, the state change of the 5GLAN service managed by the network may be performed based on a request from an application.

During the present procedure, each apparatus may transmit and/or receive a message including identification information for modifying the configuration information of the UE and/or identification information for stopping or changing the function performed by the UE. In addition, based on completion of the present procedure, each apparatus may update the configuration information for configuration indicated by the network, or may start a behavior indicated by the network.

The UE may update the configuration information of the UE, based on the control information transmitted and/or received through the present procedure. In addition, the UE may stop a function being performed or may start a new function, along with update of the configuration information of the UE. In other words, by initiating the present procedure and further by transmitting the control message and the control information of the present procedure to the UE, the apparatus in the core network may cause the UE to update the configuration information of the UE that can be identified by using these pieces of control information. In addition, by causing update of the configuration information of the UE, the apparatus in the core network may cause stop of a function being performed by the UE, or may cause the UE to start a new function.

First, the AMF transmits a Configuration update command message to the UE via the 5G AN (or the gNB) (S1000), and thereby initiates the UE configuration update procedure.

The AMF may transmit one or more pieces of identification information out of at least the 61st identification information to the 63rd identification information being included in the configuration update command message. Note that, by transmitting these pieces of identification information, the AMF may indicate new configuration information of the UE, or may request update of the configuration information of the UE. Further, two or more pieces of identification information of these pieces of identification information may be configured as one or more pieces of identification information. Note that the information indicating support of each function and the information indicating the request for the use of each function may be transmitted and/or received as the same piece of identification information, or may be transmitted and/or received as different pieces of identification information.

In a case that the network has created a new 5GLAN group and/or the network changes the 5GLAN group ID to be allowed, the AMF may transmit the 61st identification information. In other words, by transmitting the 61st identification information, the AMF may notify the UE of the 5GLAN group ID allowed by the new network.

Alternatively, in a case that a group indicated by the 5GLAN group ID associated with the PDU session for the 5GLAN that has already been established by the UE is to be deleted, that is, the network deletes the 5GLAN group to which the UE belongs, the AMF may transmit the 61st identification information. In other words, by transmitting the 61st identification information, the AMF may notify the UE that the 5GLAN group to which the UE belongs is to be deleted. In a case that the AMF gives notification that the network deletes the 5GLAN group to which the UE belongs by transmitting the 61st identification information, the AMF may include a cause value in the configuration update command message.

Alternatively, in a case that the UE is deleted from the group indicated by the 5GLAN group ID associated with the PDU session for the 5GLAN that has already been established by the UE, that is, the network deletes the UE from the 5GLAN group, the AMF may transmit the 61st identification information. In other words, by transmitting the 61st identification information, the AMF may notify the UE that the UE is to be deleted from the 5GLAN group to which the UE belongs. In a case that the AMF gives notification that the UE is to be deleted from the 5GLAN group to which the UE belongs by transmitting the 61st identification information, the AMF may include a cause value in the configuration update command message.

In a case that the network has created a new 5GLAN group, and/or there is a change or update in the 5GLAN service area active for the UE, and the 5GLAN service area active for the UE has been deleted, the AMF may transmit the 62nd identification information. In other words, by transmitting the 62nd identification information, the AMF may notify the UE that a new 5GLAN group has been created, and/or there is a change or update in the 5GLAN service area active for the UE, and the 5G LAN service area active for the UE has been deleted.

In a case that the network has created a new 5GLAN group, and/or the 5GLAN group ID allowed by the network is changed, the AMF may transmit the 63rd identification information. In other words, by transmitting the 63rd identification information, the AMF may notify the UE that the network has created a new 5GLAN group, and/or the network is to change the 5GLAN group ID allowed by the network.

In a case that the network deletes the group indicated by the 5GLAN group ID associated with the PDU session for the 5GLAN that has already been established by the UE, that is, the network deletes the 5GLAN group to which the UE belongs, the AMF may transmit the 63rd identification information. In other words, by transmitting the 63rd identification information, the AMF may notify the UE that the 5GLAN group to which the UE belongs is to be deleted. In a case that the AMF gives notification that the network deletes the 5GLAN group to which the UE belongs by transmitting the 63rd identification information, the AMF may include a cause value in the configuration update command message.

In a case that the network deletes the UE from the group indicated by the 5GLAN group ID associated with the PDU session for the 5GLAN that has already been established by the UE, that is, the network deletes the UE from the 5GLAN group to which the UE belongs, the AMF may transmit the 63rd identification information. In other words, by transmitting the 63rd identification information, the AMF may notify the UE that the UE is to be deleted from the 5GLAN group to which the UE belongs. In a case that the AMF gives notification that the UE is to be deleted from the 5GLAN group to which the UE belongs by transmitting the 63rd identification information, the AMF may include a cause value in the configuration update command message.

In a case that there is a change or update in one or multiple 5GLAN service areas active for the UE in the network, the AMF may transmit the 63rd identification information. In other words, by transmitting the 63rd identification information, the AMF may notify the UE that there is a change or update in the one or multiple 5GLAN service areas active for the UE. In addition, in a case that the network deletes one or multiple 5GLAN service areas active for the UE, the AMF may transmit the 63rd identification information. In other words, by transmitting the 63rd identification information, the AMF may notify the UE that the one or multiple 5GLAN service areas active for the UE have been deleted.

Note that the AMF may select and determine which piece of identification information out of at least the 61st identification information to the 63rd identification information is to be included in the configuration update command message, based on each piece of received identification information, and/or subscription information, and/or capability information of the network, and/or an operator policy, and/or a state of the network, and/or registration information of the user, and/or a context stored by the AMF, and the like.

The AMF may indicate a request for update of the configuration information of the UE by transmitting the configuration update command message, based on each piece of received identification information, and/or subscription information, and/or capability information of the network, and/or an operator policy, and/or a state of the network, and/or registration information of the user, and/or a context stored by the AMF, and the like.

The UE receives the configuration update command message via the 5G AN (gNB) (S1000). The UE may update the configuration information of the UE, based on the configuration update command message and/or the identification information included in the configuration update command message.

Based on reception of the 61st identification information, the UE may recognize that the 5GLAN group ID stored and held in the UE and/or the network is to be updated, may recognize that an already stored old 5GLAN group ID is inactive, may recognize that a new 5GLAN group ID indicated by the 61st identification information is active, or may recognize a combination of these. Note that the old 5GLAN group ID may be one or multiple 5GLAN group IDs stored and held by the UE before the UE receives the 61st identification information.

In addition, based on reception of the 61st identification information, the UE may update the stored 5GLAN group ID. Specifically, based on reception of the 61st identification information, the UE may store a new 5GLAN group ID indicated by the 61st identification information, or may further delete an old 5GLAN group ID.

Based on reception of the 61st identification information, the UE may initiate the release procedure of the PDU session for the 5GLAN associated with an old 5GLAN group ID. Alternatively, based on reception of the 61st identification information, the UE may initiate the release procedure of the PDU session for the 5GLAN associated with the 5GLAN group ID different from the new 5GLAN group ID indicated by the 61st identification information. Note that the release procedure of the PDU session may be a UE-requested PDU session release procedure that is initiated in a case that the UE transmits a PDU session release request message to the SMF, or may be a network-requested PDU session release procedure that is initiated in a case that the SMF transmits a PDU session release command message to the UE. In addition, the release procedure of the PDU session may be a procedure in which the UE locally releases the PDU session. Note that the UE may initiate the release procedure of the PDU session for the 5GLAN after completion of the present procedure.

In a case that the UE receives empty 61st identification information, the UE may delete the 5GLAN group ID stored by the UE and/or the information of the 5G LAN stored by the UE. Alternatively, in a case that the UE receives empty 61st identification information, the UE may initiate the release procedure of the PDU session for the 5GLAN that is associated with the 5GLAN group ID indicating the 5GLAN group to which the UE belongs. Note that the UE may initiate the release procedure of the PDU session for the 5GLAN after completion of the present procedure.

Based on reception of the 61st identification information, the UE may recognize whether or not the 5GLAN group to which the UE belongs has been deleted. For example, in a case that the 61st identification information is information indicating that the 5GLAN group to which the UE belongs has been deleted, the UE may release the PDU session for the 5GLAN. In addition, in a case that the 61st identification information is information indicating that the 5GLAN group to which the UE belongs has been deleted, the UE may delete the 5GLAN group ID associated with the PDU session for the 5GLAN and/or the information of the 5GLAN related to the 5GLAN group ID associated with the PDU session for the 5GLAN. In contrast, in a case that the 61st identification information is information indicating that the 5GLAN group to which the UE belongs has not been deleted, the UE maintains the information related to the PDU session for the 5GLAN, and maintains establishment of the PDU session for the 5GLAN.

Based on reception of the 61st identification information, the UE may recognize whether or not the UE has been deleted from the 5GLAN group to which the UE belongs. For example, in a case that the 61st identification information is information indicating that the UE has been deleted from the 5GLAN group to which the UE belongs, the UE may release the PDU session for the 5GLAN. In addition, in a case that the 61st identification information is information indicating that the UE has been deleted from the 5GLAN group to which the UE belongs, the UE may maintain the 5GLAN group ID associated with the PDU session for the 5GLAN and/or the information of the 5GLAN related to the 5GLAN group ID associated with the PDU session for the 5GLAN. In this case, the UE may add the 5GLAN group ID of the 5GLAN group from which the UE has been deleted to a set of rejected 5GLAN group IDs. In contrast, in a case that the 61st identification information is information indicating that the UE has not been deleted from the 5GLAN group to which the UE belongs, the UE maintains the information related to the PDU session for the 5GLAN, and maintains establishment of the PDU session for the 5GLAN.

Based on reception of the 61st identification information, the UE may recognize that the 5GLAN group has been newly created. Based on reception of the 61st identification information, the UE may recognize that the UE has been added to a new group. Based on reception of the 61st identification information, the UE may recognize that it is a state in which the UE can be added to a new 5GLAN group, or may recognize that the network requires the UE to be added to a new group.

Based on reception of the 62nd identification information, the UE may recognize that the 5GLAN service area is to be updated. Specifically, based on the 62nd identification information, the UE may recognize that an old 5GLAN service area has been changed to be inactive or is inactive. Based on the 62nd identification information, the UE may recognize that a new 5GLAN service area indicated by the 62nd identification information has been changed to be active or is active. Note that, here, the old 5GLAN service area may be one or multiple 5GLAN service areas allowed by the network that are stored before the UE receives the 62nd identification information.

Based on reception of the 62nd identification information, the UE may update the stored 5GLAN service area. Specifically, based on reception of the 62nd identification information, the UE may store the new 5GLAN service area indicated by the 62nd identification information, or may delete the old 5GLAN service area from storage.

In a case that the UE receives empty 62nd identification information, the UE may delete the stored 5GLAN service area and/or the information related to the stored 5GLAN service area. Alternatively, in a case that the UE receives empty 62nd identification information, the UE may initiate the release procedure of the PDU session for the 5GLAN. Note that the release procedure of the PDU session may be a UE-requested PDU session release procedure that is initiated in a case that the UE transmits a PDU session release request message to the SMF, or may be a network-requested PDU session release procedure that is initiated in a case that the SMF transmits a PDU session release command message to the UE. In addition, the release procedure of the PDU session may be a procedure in which the UE locally releases the PDU session. Note that the UE may initiate the release procedure of the PDU session for the 5GLAN after completion of the present procedure.

Based on reception of the 62nd identification information, the UE may recognize that the 5GLAN group has been newly created. Based on reception of the 62nd identification information, the UE may recognize that the UE has been added to a new group. Based on reception of the 62nd identification information, the UE may recognize that it is a state in which the UE can be added to a new 5GLAN group, or may recognize that the network requires the UE to be added to a new group.

Based on reception of the 63rd identification information, the UE may recognize that the information of the 5GLAN is to be updated. Specifically, based on reception of the 63rd identification information, the UE may recognize that old information of a 5GLAN has been changed to be inactive or is inactive. Based on reception of the 63rd identification information, the UE may recognize that new information of a 5GLAN has been changed to be active or is active. Note that, here, the old information of the 5GLAN may be information of the 5GLAN that is stored before the UE receives the 63rd identification information.

Based on reception of the 63rd identification information, the UE may update the stored information of the 5GLAN. Specifically, based on reception of the 63rd identification information, the UE may store the new information of the 5GLAN indicated by the 63rd identification information, may delete the old information of the 5GLAN from storage, or may perform both.

Based on reception of the 63rd identification information, the UE may initiate the release procedure of the PDU session for the 5GLAN associated with the old information of the 5GLAN. Note that the UE may locally release the PDU session as the release procedure of the PDU session for the 5GLAN. Note that the UE may initiate the release procedure of the PDU session for the 5GLAN after completion of the present procedure.

Based on reception of the 63rd identification information, the UE may initiate the release procedure of the PDU session for the 5GLAN associated with the information of the 5GLAN different from the new information of the 5GLAN indicated by the 63rd identification information. Note that the release procedure of the PDU session may be a UE-requested PDU session release procedure that is initiated in a case that the UE transmits a PDU session release request message to the SMF, or may be a network-requested PDU session release procedure that is initiated in a case that the SMF transmits a PDU session release command message to the UE. In addition, the release procedure of the PDU session may be a procedure in which the UE locally releases the PDU session. Note that the UE may initiate the release procedure of the PDU session for the 5GLAN after completion of the present procedure.

In a case that the UE receives empty 63rd identification information, the UE may delete the stored 5GLAN service area and/or the information related to the stored 5GLAN service area. Alternatively, in a case that the UE receives empty 63rd identification information, the UE may initiate the release procedure of the PDU session for the 5GLAN. Note that the UE may initiate the release procedure of the PDU session for the 5GLAN after completion of the present procedure.

Based on reception of the 63rd identification information, the UE may recognize whether or not the 5GLAN group to which the UE belongs has been deleted. For example, in a case that the 63rd identification information is information indicating that the 5GLAN group to which the UE belongs has been deleted, the UE may release the PDU session for the 5GLAN. In addition, in a case that the 63rd identification information is information indicating that the 5GLAN group to which the UE belongs has been deleted, the UE may delete the 5GLAN group ID associated with the PDU session for the 5GLAN and/or the information of the 5GLAN related to the 5GLAN group ID associated with the PDU session for the 5GLAN. In contrast, in a case that the 63rd identification information is information indicating that the 5GLAN group to which the UE belongs has not been deleted, the UE maintains the information related to the PDU session for the 5GLAN, and maintains establishment of the PDU session for the 5GLAN.

Based on reception of the 63rd identification information, the UE may recognize whether or not the UE has been deleted from the 5GLAN group to which the UE belongs. For example, in a case that the 63rd identification information is information indicating that the UE has been deleted from the 5GLAN group to which the UE belongs, the UE may release the PDU session for the 5GLAN. In addition, in a case that the 63rd identification information is information indicating that the UE has been deleted from the 5GLAN group to which the UE belongs, the UE may maintain the 5GLAN group ID associated with the PDU session for the 5GLAN and/or the information of the 5GLAN related to the 5GLAN group ID associated with the PDU session for the 5GLAN. In this case, the UE may add the 5GLAN group ID of the 5GLAN group from which the UE has been deleted to a set of rejected 5GLAN group IDs. In contrast, in a case that the 63rd identification information is information indicating that the UE has not been deleted from the 5GLAN group to which the UE belongs, the UE maintains the information related to the PDU session for the 5GLAN, and maintains establishment of the PDU session for the 5GLAN.

Based on reception of the 63rd identification information, the UE may recognize that the 5GLAN group has been newly created. Based on reception of the 63rd identification information, the UE may recognize that the UE has been added to a new group. Based on reception of the 63rd identification information, the UE may recognize that it is a state in which the UE can be added to a new 5GLAN group, or may recognize that the network requires the UE to be added to a new group.

Note that each processing described in the above performed by the UE based on reception of each piece of identification information may be performed during the present procedure or after completion of the present procedure, or may be performed based on completion of the present procedure after completion of the present procedure. In addition, based on the identification information included in the configuration update command message, the UE may transmit a Configuration update complete message to the AMF via the 5G AN (gNB) as a response message for the configuration update command message (S1002).

In a case that the UE transmits the configuration update complete command message, the AMF receives the configuration update complete message via the 5G AN (gNB) (S1002). Based on transmission and/or reception of the configuration update command message and/or the configuration update complete message, each apparatus completes the present procedure.

In addition, based on completion of the present procedure, each apparatus may perform processing that is based on the information transmitted and/or received in the present procedure. For example, in a case that each apparatus transmits and/or receives update information for the configuration information, each apparatus may update the configuration information. In addition, in a case that the UE transmits and/or receives information indicating that the registration procedure is required to be performed, the UE may initiate the registration procedure, based on completion of the present procedure.

In addition, based on completion of the present procedure, the UE may store identification information received together with a configuration information command message, or may recognize determination of the network.

For example, in a case that the UE receives the 61st identification information, the UE may initiate the registration procedure after completion of the present procedure. Specifically, by transmitting the Registration request message including the new 5GLAN group ID received in the 61st identification information, the UE may initiate the registration procedure.

In a case that the UE receives the 61st identification information, the UE may initiate the PDU session establishment procedure for the 5GLAN after completion of the present procedure. Specifically, by transmitting the PDU session establishment request message including the 5GLAN group ID that is indicated by the 61st identification information, the UE may initiate the PDU session establishment procedure for the 5GLAN.

In a case that the UE receives the 62nd identification information, the UE may initiate the registration procedure after completion of the present procedure. Specifically, by transmitting the Registration request message while the UE is present in the new 5GLAN service area received in the 62nd identification information, the UE may initiate the registration procedure.

In a case that the UE receives the 62nd identification information, the UE may initiate the PDU session establishment procedure for the 5GLAN after completion of the present procedure. Specifically, by transmitting the PDU session establishment request message including the 5GLAN group ID corresponding to the 5GLAN service area while the UE is present in the new 5GLAN service area that is indicated by the 62nd identification information, the UE may initiate the PDU session establishment procedure for the 5GLAN.

In a case that the UE receives the 63rd identification information, the UE may initiate the registration procedure after completion of the present procedure. Specifically, by transmitting the Registration request message including the 5GLAN group ID corresponding to the 5GLAN service area while the UE is present in the 5GLAN service area included in the new information of the 5GLAN that is indicated by the 63rd identification information, the UE may initiate the registration procedure.

In a case that the UE receives the 63rd identification information, the UE may initiate the PDU session establishment procedure for the 5GLAN after completion of the present procedure. Specifically, by transmitting the PDU session establishment request message including the 5GLAN group ID corresponding to the 5GLAN service area while the UE is present in the new 5GLAN service area that is indicated by the 63rd identification information, the UE may initiate the PDU session establishment procedure for the 5GLAN.

In the procedure described above, through transmission and/or reception of the configuration update command message, the apparatus in the core network can command the UE to update the configuration information that the UE has already applied, and can command the UE to stop or change the function that the UE performs.

3.2.4. Network-Initiated PDU Session Management Procedure

Next, an overview of the network-initiated PDU session management procedure will be described. In the following, the network-initiated PDU session management procedure is also referred to as the present procedure. The present procedure is a procedure for a session management initiated and performed by the network for the established PDU session. Note that the present procedure may be performed at any timing after completion of the registration procedure and/or the PDU session establishment procedure described above.

Note that the present procedure may be a network-initiated PDU session modification procedure and/or a network-initiated PDU session release procedure, and the like, or a network-initiated session management procedure not limited to these may be performed.

Figure 9:
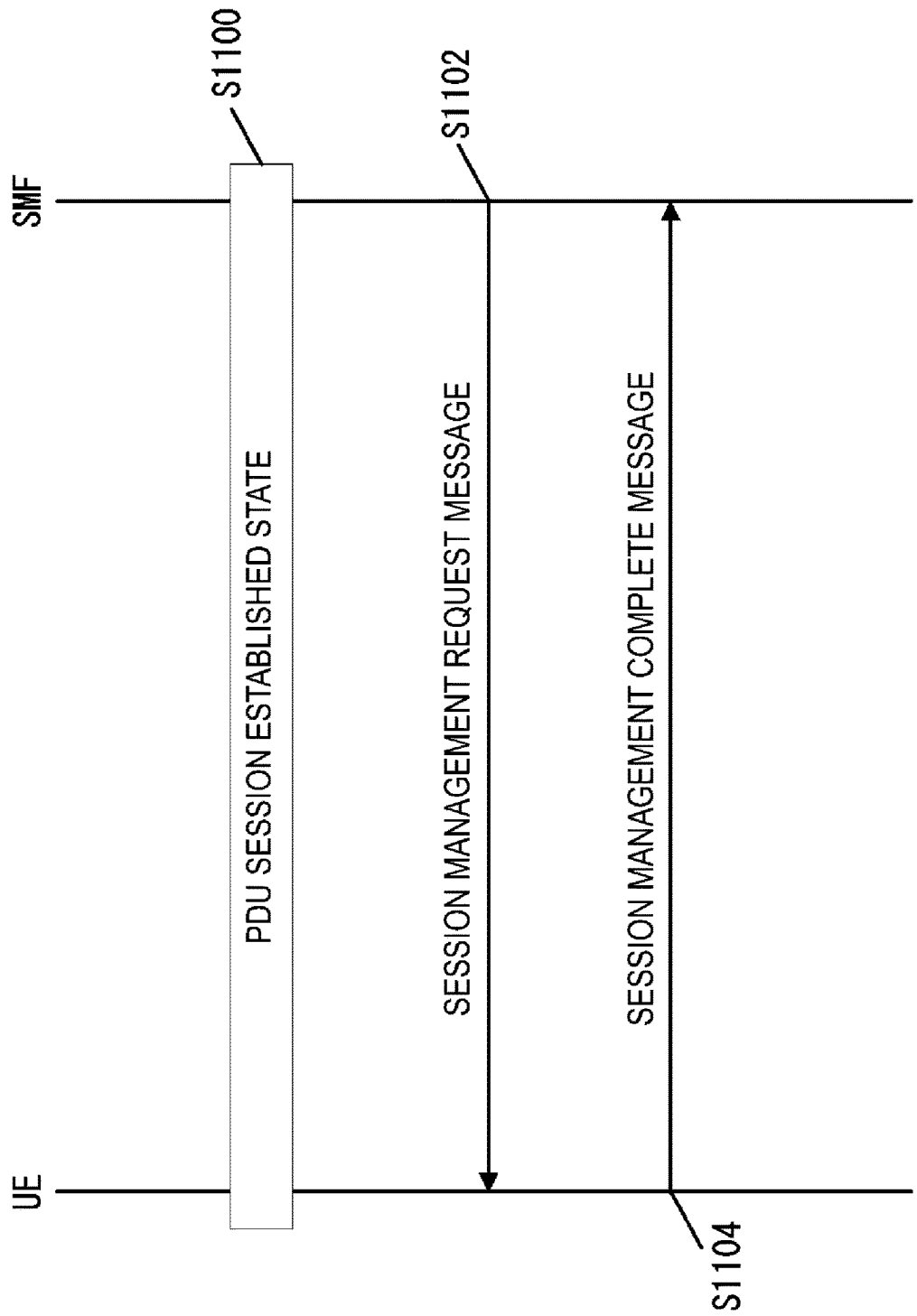
FIG. 9 is a diagram illustrating a network-initiated PDU session management procedure.

Note that, in the network-initiated PDU session modification procedure, each apparatus may transmit and/or receive a PDU session modification command message, and/or a PDU session modification complete message, and/or a PDU session modification command reject message. In a similar manner, in the network-initiated PDU session release procedure, the apparatus may transmit and/or receive a PDU session release command message, and/or a PDU session release complete message. In the following, steps of the present procedure will be described with reference to FIG. 9.

As described above, based on completion of the registration procedure and/or the PDU session establishment procedure, the UE and the SMF that have transitioned to a state in which at least one PDU session has been established (S1100) initiate the network-initiated session management procedure at any timing.

Specifically, the SMF transmits a session management request message to the UE (S1102), and thereby initiates the present procedure. In a case that the present procedure is the PDU session modification procedure, the session management request message may be the PDU session modification command message. In a similar manner, in a case that the present procedure is the PDU session release procedure, the session management request message may be the PDU session release command message.

Here, the SMF may include the 71st identification information in the session management request message, or may indicate a request of the network or the SMF by including the identification information. In addition, the SMF may transmit a value of the back-off timer being included in the session management request message.

In a case that the network deletes the group indicated by the 5GLAN group ID associated with the PDU session for the 5GLAN that has already been established by the UE, that is, the 5GLAN group to which the UE belongs is deleted and/or the network determines deletion of the 5GLAN group, the SMF may transmit the 71st identification information.

Alternatively, in a case that the UE is deleted from the group indicated by the 5GLAN group ID associated with the PDU session for the 5GLAN that has already been established by the UE, that is, the UE is deleted from the 5GLAN group to which the UE belongs and/or the network determines deletion of the UE from the 5GLAN group, the SMF may transmit the 71st identification information.

Next, the UE that has received the session management request message transmits a session management complete message (S1104). In a case that the present procedure is the PDU session modification procedure, the session management complete message may be the PDU session modification complete message. In a similar manner, in a case that the present procedure is the PDU session release procedure, the session management complete message may be the PDU session release complete message.

In a case that the UE transmits the session management complete message, the SMF receives the session management complete message via the 5G AN (gNB) and the AMF (S1104). Based on transmission and/or reception of the session management request message and/or the session management complete message, each apparatus completes the present procedure.

In addition, based on completion of the present procedure, each apparatus may perform processing that is based on the information transmitted and/or received in the present procedure. For example, in a case that the present procedure is the PDU session modification procedure and/or each apparatus transmits and/or receives information for indicating modification of the configuration of the PDU session in the present procedure, each apparatus may modify the configuration of the PDU session that has already been established. For example, in a case that the present procedure is the PDU session release procedure and/or each apparatus transmits and/or receives information indicating a request for release of the PDU session in the present procedure, each apparatus may transition to a state in which the already established PDU session has been released. In addition, in a case that all of the established PDU sessions are released through the present procedure, each apparatus may transition to the disconnected state. In addition, in a case that each apparatus transmits and/or receives information for indicating reestablishment of the PDU session in the present procedure, the UE may initiate the PDU session establishment procedure.

Based on reception of the 71st identification information, the UE may recognize that the PDU session is to be released. Based on reception of the 71st identification information, the UE may recognize a cause why the PDU session is to be released.

Based on reception of the 71st identification information, the UE may recognize that the PDU session for the 5GLAN is to be released. Based on reception of the 71st identification information, the UE may recognize that the PDU session for the 5GLAN is no longer available.

Based on reception of the 71st identification information, the UE may recognize that the PDU session for the 5GLAN is no longer available in the current PLMN. Based on reception of the 71st identification information, the UE may recognize that the PDU session for the 5GLAN is no longer available in the current area. Based on reception of the 71st identification information, the UE may recognize that the 5GLAN group ID associated with the PDU session for the 5GLAN is no longer available.

Based on reception of the 71st identification information, the UE may start count of the back-off timer. Here, as the back-off timer started by the UE, a back-off timer value received from the network may be used, or a timer value stored by the UE may be used. While the UE performs at least count of the back-off timer, the UE may not initiate the PDU session establishment procedure again, may stop the PDU session establishment procedure, or may be prohibited to perform the PDU session establishment procedure.

Based on reception of the 71st identification information, the UE may recognize whether or not the 5GLAN group to which the UE belongs has been deleted. For example, in a case that the 71st identification information is information indicating that the 5GLAN group to which the UE belongs has been deleted, the UE may delete the 5GLAN group ID associated with the PDU session for the 5GLAN and/or the information of the 5GLAN related to the 5GLAN group ID associated with the PDU session for the 5GLAN from storage. In a case that the 71st identification information is information indicating that the 5GLAN group to which the UE belongs has been deleted, the UE may transition to a state in which the PDU session establishment procedure for establishing the PDU session for the 5GLAN is prohibited.

Based on reception of the 71st identification information, the UE may recognize whether or not the UE has been deleted from the 5GLAN group to which the UE belongs. In a case that the 71st identification information is information indicating that the UE has been deleted from the 5GLAN group to which the UE belongs, the UE may maintain the 5GLAN group ID associated with the PDU session for the 5GLAN and/or the information of the 5GLAN related to the 5GLAN group ID associated with the PDU session for the 5GLAN. In a case that the 71st identification information is information indicating that the UE has been deleted from the 5GLAN group to which the UE belongs, the UE may transition to a state in which the PDU session establishment procedure for establishing the PDU session for the 5GLAN using the 5GLAN group ID indicating the deleted 5GLAN group is prohibited. In this case, the UE may add the 5GLAN group ID of the 5GLAN group from which the UE has been deleted to a set of rejected 5GLAN group IDs.

Note that each processing described in the above performed by the UE based on reception of each piece of identification information may be performed during the present procedure or after completion of the present procedure, or may be performed based on completion of the present procedure after completion of the present procedure. In the procedure described above, through transmission and/or reception of the network-initiated session management request message, the apparatus in the core network can command the UE to update or delete the configuration of the PDU session that the UE has already established.

In a case that the UE receives the 71st identification information, the UE may release the PDU session for the 5GLAN, based on completion of the present procedure and/or reception of the 71st identification information after completion of the present procedure.

In a case that the UE runs the back-off timer, the UE may transition to a state in which the PDU session establishment procedure for establishing the PDU session for the 5GLAN can be performed after expiration of the count of the back-off timer and after completion of the present procedure.

4. Description of Embodiments

In the following, a first embodiment and a second embodiment will be described. Each embodiment will describe an embodiment in which, after the UE is registered with the network, the network creates the 5GLAN group and the UE belongs to the 5GLAN group.

In addition, the first embodiment will describe an embodiment in which, after the UE belongs to the 5GLAN group, deletion of the 5GLAN group to which the UE belongs or deletion of the UE from the 5GLAN group to which the UE belongs is implemented by using the UE configuration modification procedure.

The second embodiment will describe an embodiment in which, after the UE belongs to the 5GLAN group, deletion of the 5GLAN group to which the UE belongs or deletion of the UE from the 5GLAN group to which the UE belongs is implemented by using the PDU session management procedure.

Note that a procedure combining the first embodiment and the second embodiment may be performed. Specifically, after the UE belongs to the 5GLAN group, the deletion of the 5GLAN group to which the UE belongs may be implemented by using the UE configuration modification procedure, and the deletion of the UE from the 5GLAN group to which the UE belongs may be implemented by using the PDU session management procedure. In contrast, after the UE belongs to the 5GLAN group, the deletion of the 5GLAN group to which the UE belongs may be implemented by using the PDU session management procedure, and the deletion of the UE from the 5GLAN group to which the UE belongs may be implemented by using the UE configuration modification procedure.

4.1 First Embodiment

Next, the first embodiment will be described. In the following, the first embodiment is referred to as the present embodiment. In the communication procedure according to the present embodiment, first, each apparatus performs the first registration procedure initiated by the UE. In this case, the 5GLAN service may be allowed for the UE by the network, or may not be allowed. Specifically, the UE may be unable to receive the 11th identification information to the 18th identification information in the first registration procedure. Alternatively, by receiving at least one piece of identification information out of at least the 11th identification information to the 13th identification information in the first registration procedure, the UE may transition to a state in which the 5GLAN service is allowed by the network. The UE may receive at least one piece of identification information out of the 11th identification information to the 18th identification information in the first registration procedure.

Next, with each apparatus performing the first UE configuration update procedure, the UE may store information of the 5GLAN group ID, and/or the 5GLAN service area, and/or the 5GLAN allowed by the network. The UE may receive at least one piece of identification information out of the 61st identification information to the 63rd identification information in the first UE configuration update procedure. The 61st identification information to the 63rd identification information received by the UE in the first UE configuration update procedure may be information including the 5GLAN group ID indicating the 5GLAN group created by the network, and/or information related to the 5GLAN group ID.

Note that each apparatus may perform the second registration procedure, based on the information transmitted and/or received in the first UE configuration update procedure after completion of the first UE configuration update procedure. The UE may store information of the 5GLAN group ID and/or 5GLAN allowed by the network in the second registration procedure. The UE may receive at least one piece of identification information out of the 11th identification information to the 18th identification information in the second registration procedure. By receiving the 13th identification information in the second registration procedure, the UE may store the 5GLAN group ID allowed by the network. The UE may use the information received during the first UE configuration update procedure in the second registration procedure.

Next, by performing the PDU session establishment procedure initiated by the UE, each apparatus establishes the PDU session for the 5GLAN, and transitions to a state in which each apparatus can perform private communication with other UEs belonging to the same group. Next, each apparatus performs transmission and/or reception of the user data by using the private communication.

Next, by performing the second UE configuration update procedure initiated by the core network, each apparatus performs deletion of the 5GLAN group or deletion of the UE from the 5GLAN group. Specifically, in a case that the network deletes the 5GLAN group to which the UE belongs, based on reception of at least one piece of identification information out of the 61st identification information to the 63rd identification information, the UE may recognize that the 5GLAN group has been deleted, and may further perform processing accompanying the deletion of the 5G LAN group.

Specifically, in a case that the 5LAN group is deleted, the UE may initiate the release procedure of the PDU session for the 5GLAN, and the UE may further delete the 5GLAN group ID associated with the PDU session for the 5GLAN and/or the information of the 5GLAN related to the 5GLAN group ID associated with the PDU session for the 5GLAN.

In a case that the 5GLAN group is deleted, the UE may delete the stored 5GLAN service area and/or the information related to the stored 5GLAN service area.

In a case that the 5GLAN group is deleted, the UE may transition to a state in which the PDU session establishment procedure for establishing the PDU session for the 5GLAN is prohibited.

In a case that the network deletes the UE from the 5GLAN group to which the UE belongs, based on reception of at least one piece of identification information out of the 61st identification information to the 63rd identification information, the UE may recognize that the UE has been deleted from the 5GLAN group, and may further perform processing accompanying the deletion of the UE from the 5GLAN group. Note that the expression that the network deletes the UE from the 5GLAN group to which the UE belongs may mean that the network removes the UE from the 5GLAN group to which the UE belongs.

Specifically, in a case that the UE is deleted from the 5GLAN group, the UE may initiate the release procedure of the PDU session for the 5GLAN. In a case that the UE is deleted from the 5GLAN group, the UE may maintain the 5GLAN group ID associated with the PDU session for the 5GLAN and/or the information of the 5GLAN related to the 5GLAN group ID associated with the PDU session for the 5GLAN. In a case that the UE is deleted from the 5GLAN group and further the UE stores the 5GLAN group ID associated with the PDU session for the 5GLAN as the 5GLAN group ID allowed by the network, the UE may store the 5GLAN group ID associated with the PDU session for the 5GLAN as the 5GLAN group ID rejected by the network, or may update storage.

In a case that the UE is deleted from the 5GLAN group, the UE may transition to a state in which the PDU session establishment procedure for establishing the PDU session for the 5GLAN using the 5GLAN group ID indicating the deleted 5GLAN group is prohibited.

After completion of the present procedure, the UE may transition to a state in which transmission and/or reception of the user data cannot be performed by using private communication associated with a corresponding 5GLAN group ID.

Note that, in each procedure, each apparatus may transmit and/or receive a reject message for a request from each apparatus. In a case that the request in each procedure is rejected, each apparatus may initiate the procedure again, or may stop the subsequent procedure.

Note that, in a case that the 5GLAN group has already been created by the network at the time of the first registration procedure, in the first registration procedure, the UE may receive the 13th identification information, and may further omit the first UE configuration update procedure and the second registration procedure. Note that, also in a case that the UE receives the 13th identification information at the time of the first registration procedure, each apparatus may perform the first UE configuration update procedure and the second registration procedure.

4.2 Second Embodiment

Next, the second embodiment will be described. In the following, the second embodiment is referred to as the present embodiment. In the communication procedure according to the present embodiment, first, each apparatus performs the first registration procedure initiated by the UE. In this case, the 5GLAN service may be allowed for the UE by the network, or may not be allowed. Specifically, the UE may be unable to receive the 11th identification information to the 18th identification information in the first registration procedure. Alternatively, by receiving at least one piece of identification information out of at least the 11th identification information to the 13th identification information in the first registration procedure, the UE may transition to a state in which the 5GLAN service is allowed by the network. The UE may receive at least one piece of identification information out of the 11th identification information to the 18th identification information in the first registration procedure.

Next, with each apparatus performing the first UE configuration update procedure, the UE may store information of the 5GLAN group ID, and/or the 5GLAN service area, and/or the 5GLAN allowed by the network. The UE may receive at least one piece of identification information out of the 61st identification information to the 63rd identification information in the first UE configuration update procedure. The 61st identification information to the 63rd identification information received by the UE in the first UE configuration update procedure may be information including the 5GLAN group ID indicating the 5GLAN group created by the network, and/or information related to the 5GLAN group ID.

Note that each apparatus may perform the second registration procedure, based on the information transmitted and/or received in the first UE configuration update procedure after completion of the first UE configuration update procedure. The UE may store information of the 5GLAN group ID and/or 5GLAN allowed by the network in the second registration procedure. The UE may receive at least one piece of identification information out of the 11th identification information to the 18th identification information in the second registration procedure. By receiving the 13th identification information in the second registration procedure, the UE may store the 5GLAN group ID allowed by the network. The UE may use the information received during the first UE configuration update procedure in the second registration procedure.

Next, by performing the PDU session establishment procedure initiated by the UE, each apparatus establishes the PDU session for the 5GLAN, and transitions to a state in which each apparatus can perform private communication with other UEs belonging to the same group. Next, each apparatus performs transmission and/or reception of the user data by using the private communication.

Next, by performing the PDU session management procedure initiated by the network, each apparatus performs deletion of the 5GLAN group or deletion of the UE from the 5GLAN group. Specifically, in a case that the network deletes the 5GLAN group to which the UE belongs, based on reception of the 71st identification information, the UE may recognize that the 5GLAN group has been deleted, and may further perform processing accompanying the deletion of the 5G LAN group.

Specifically, in a case that the 5GLAN group is deleted, the UE may release the PDU session for the 5GLAN, and the UE may further delete the 5GLAN group ID associated with the PDU session for the 5GLAN and/or the information of the 5GLAN related to the 5GLAN group ID associated with the PDU session for the 5GLAN.

In a case that the 5GLAN group is deleted, the UE may delete the stored 5GLAN service area and/or the information related to the stored 5GLAN service area.

In a case that the 5GLAN group is deleted, the UE may transition to a state in which the PDU session establishment procedure for establishing the PDU session for the 5GLAN is prohibited.

In a case that the network deletes the UE from the 5GLAN group to which the UE belongs, based on reception of the 71st identification information, the UE may recognize that the UE has been deleted from the 5G LAN group, and may further perform processing accompanying the deletion of the UE from the 5GLAN group. Note that the expression that the network deletes the UE from the 5GLAN group to which the UE belongs may mean that the network removes the UE from the 5GLAN group to which the UE belongs.

Specifically, in a case that the UE is deleted from the 5GLAN group, the UE may release the PDU session for the 5GLAN. In a case that the UE is deleted from the 5GLAN group, the UE may maintain the 5GLAN group ID associated with the PDU session for the 5GLAN and/or the information of the 5GLAN related to the 5GLAN group ID associated with the PDU session for the 5GLAN. In a case that the UE is deleted from the 5GLAN group and further the UE stores the 5GLAN group ID associated with the PDU session for the 5GLAN as the 5GLAN group ID allowed by the network, the UE may store the 5GLAN group ID associated with the PDU session for the 5GLAN as the 5GLAN group ID rejected by the network, or may update storage.

In a case that the UE is deleted from the 5GLAN group, the UE may transition to a state in which the PDU session establishment procedure for establishing the PDU session for the 5GLAN using the 5GLAN group ID indicating the deleted 5GLAN group is prohibited.

After completion of the present procedure, the UE may transition to a state in which transmission and/or reception of the user data cannot be performed by using private communication associated with a corresponding 5GLAN group ID.

Note that, in each procedure, each apparatus may transmit and/or receive a reject message for a request from each apparatus. In a case that the request in each procedure is rejected, each apparatus may initiate the procedure again, or may stop the subsequent procedure.

Note that, in a case that the 5GLAN group has already been created by the network at the time of the first registration procedure, in the first registration procedure, the UE may receive the 13th identification information, and may further omit the first UE configuration update procedure and the second registration procedure. Note that, also in a case that the UE receives the 13th identification information at the time of the first registration procedure, each apparatus may perform the first UE configuration update procedure and the second registration procedure.

5. Modifications

A program running on an apparatus according to the present invention may serve as a program that controls a Central Processing Unit (CPU) and the like to cause a computer to function in such a manner as to realize the functions of the embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing the functions of the embodiment according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The above-mentioned electric circuit may include a digital circuit, or may include an analog circuit. In a case that with advances in semiconductor technology, a circuit integration technology appears that replaces the present integrated circuits, one or multiple aspects of the present invention are also possible to use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The invention claimed is:

1. A User Equipment (UE) comprising:
transmitting and receiving circuitry configured to receive a first control message including first information from a control device; and
a memory configured to store the first information based on receipt of the first control message,
wherein
the first information includes a Data Network Name (DNN),
the DNN is associated with a first group,
the first group consists of a set of UEs using private communication for 5G Local Area Data Network (5G LAN)-type services,
in a network-requested procedure, the transmitting and receiving circuitry receives a second control message,
the second control message does not include a DNN associated with the first group, and
based on the second control message, the memory deletes the first information.

2. A User Equipment (UE) comprising:
transmitting and receiving circuitry configured to receive a first control message including first information from a control device; and
a memory configured to store the first information based on receipt of the first control message,
wherein
the first information includes a Data Network Name (DNN),
the DNN is associated with a first group,
the first group consists of a set of UEs using private communication for 5G Local Area Data Network (5G LAN)-type services,
in a network-requested procedure, the transmitting and receiving circuitry receives a second control message including a second information,
the second information includes a DNN associated with the first group, and
based on the second control message, the memory replaces the first information with the second information.

3. A communication control method performed by a User Equipment (UE), the communication control method comprising:

receiving a first control message including first information from a control device; and storing the first information based on receipt of the first control message, wherein the first information includes a Data Network Name (DNN), the DNN is associated with a first group, the first group consists of a set of UEs using private communication for 5G Local Area Data Network (5G LAN)-type services, the communication control method further comprising:

in a network-requested procedure, receiving a second control message, wherein the second control message does not include a DNN associated with the first group; and based on the second control message, deleting the first information.

4. A communication control method performed by a User Equipment (UE), the communication control method comprising:

receiving a first control message including first information from a control device; and storing the first information based on receipt of the first control message, wherein the first information includes a Data Network Name (DNN), the DNN is associated with a first group, the first group consists of a set of UEs using private communication for 5G Local Area Data Network (5G LAN)-type services, the communication control method further comprising:

in a network-requested procedure, receiving a second control message including a second information, wherein the second information includes a DNN associated with the first group; and based on the second control message, replacing the first information with the second information.

* * * * *